US010942494B1

(12) United States Patent
Raghavan et al.

(10) Patent No.: US 10,942,494 B1
(45) Date of Patent: Mar. 9, 2021

(54) DEVICE TRANSITIONS BETWEEN INACTIVE AND ACTIVE STATES

(71) Applicant: Amazon Technologies, Inc., Seattle, WA (US)

(72) Inventors: Sudarshan Narasimha Raghavan, Snoqualmie, WA (US); Michel Leonard Goldstein, Seattle, WA (US); Fan Sun, Seattle, WA (US); Ramanathan Palaniappan, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/164,680

(22) Filed: Oct. 18, 2018

Related U.S. Application Data

(63) Continuation of application No. 14/581,982, filed on Dec. 23, 2014, now Pat. No. 10,108,157.

(51) Int. Cl.
*G05B 15/02* (2006.01)
*G06K 9/00* (2006.01)

(52) U.S. Cl.
CPC .......... *G05B 15/02* (2013.01); *G06K 9/00771* (2013.01)

(58) Field of Classification Search
None
See application file for complete search history.

(56) References Cited

U.S. PATENT DOCUMENTS

| | | | |
|---|---|---|---|
| 7,225,980 | B2 | 6/2007 | Ku et al. |
| 7,949,568 | B2 | 5/2011 | Fano et al. |
| 8,009,864 | B2 | 8/2011 | Linaker et al. |
| 8,175,925 | B1 | 5/2012 | Rouaix |
| 8,189,855 | B2 | 5/2012 | Opalach et al. |
| 8,423,431 | B1 | 4/2013 | Rouaix et al. |
| 8,630,924 | B2 | 1/2014 | Groenevelt et al. |
| 8,688,598 | B1 | 4/2014 | Shakes et al. |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Mohammad Ali
*Assistant Examiner* — Saad M Kabir
(74) *Attorney, Agent, or Firm* — Athorus, PLLC

(57) ABSTRACT

Described is a method for determining when to transition devices between different states based on determined potential activity in an area near the devices. When the potential for activity near an input device is below a threshold, the device is maintained in an inactive state. When the potential for activity near the device exceeds the threshold, the device is transitioned to an active state before the potential activity can occur near the device. Likewise, when the device is in an active state, the implementations described herein provide the ability to determine when to begin and end transmission of data from the device to a remote computing resource for processing. For example, obtained video may be processed locally to determine if an activity is occurring. If an activity is occurring, relevant data is sent to a remote computing resource to determine if an action has been performed during the activity.

20 Claims, 16 Drawing Sheets

(56) References Cited

U.S. PATENT DOCUMENTS

| | | |
|---|---|---|
| 9,473,747 B2 | 10/2016 | Kobres et al. |
| 10,108,157 B1 * | 10/2018 | Raghavan .......... G06K 9/00771 |
| 2003/0002712 A1 | 1/2003 | Steenburgh et al. |
| 2004/0181467 A1 | 9/2004 | Raiyani et al. |
| 2008/0055087 A1 | 3/2008 | Horii et al. |
| 2008/0077511 A1 | 3/2008 | Zimmerman |
| 2008/0109114 A1 | 5/2008 | Orita et al. |
| 2009/0121017 A1 | 5/2009 | Cato et al. |
| 2009/0245573 A1 | 10/2009 | Saptharishi et al. |
| 2011/0011936 A1 | 1/2011 | Morandi et al. |
| 2011/0212717 A1 | 9/2011 | Rhoads et al. |
| 2012/0284132 A1 | 11/2012 | Kim et al. |
| 2013/0076898 A1 | 3/2013 | Philippe et al. |
| 2013/0253700 A1 | 9/2013 | Carson et al. |
| 2014/0279294 A1 | 9/2014 | Field-Darragh et al. |
| 2014/0362223 A1 | 12/2014 | LaCroix et al. |
| 2015/0019391 A1 | 1/2015 | Kumar et al. |
| 2015/0073907 A1 | 3/2015 | Purves et al. |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

* cited by examiner

US 10,942,494 B1

DEVICE TRANSITIONS BETWEEN INACTIVE AND ACTIVE STATES

PRIORITY CLAIM

This application is a continuation of U.S. patent application Ser. No. 14/581,982, filed Dec. 23, 2014, which will issue as U.S. Pat. No. 10,108,157 on Oct. 23, 2018, the disclosure of which is incorporated herein by reference in its entirety.

BACKGROUND

Retailers, wholesalers, and other product distributors typically maintain an inventory of various items that may be ordered, purchased, leased, borrowed, rented, viewed, etc., by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can locate items from within the store, pick the items from inventory and take them to a cashier for purchase, rental, etc.

It is often desirable to track inventory items at their location. Some fulfillment centers and/or physical stores may utilize barcodes, radio frequency identifier tags, etc., to track inventory within the facility.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
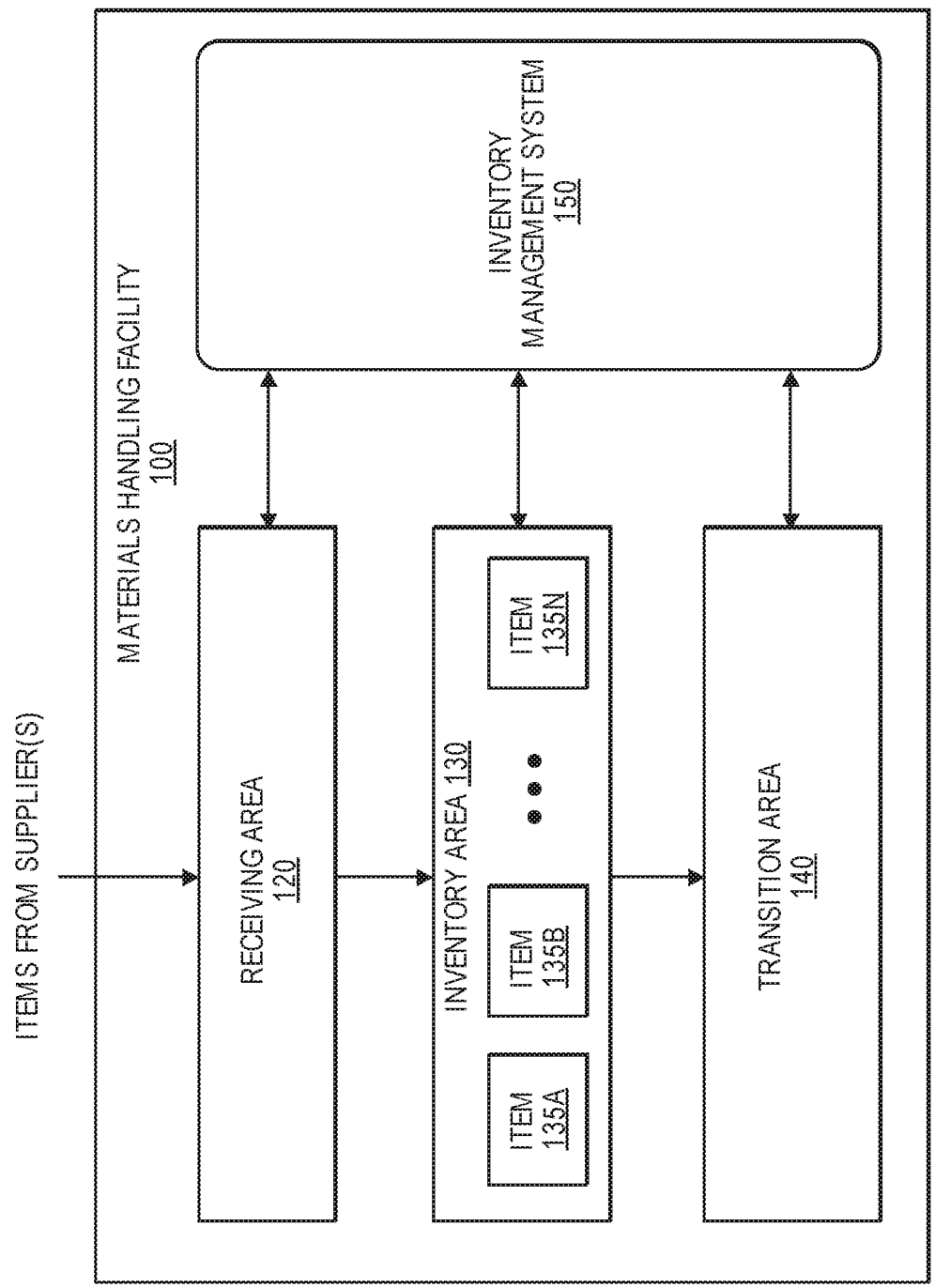
FIG. 1 is a block diagram illustrating a materials handling facility, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (i.e., through an intermediary), physical or wireless, mechanical, chemical, optical, analog, digital, or electrical.

DETAILED DESCRIPTION

This disclosure describes a system for transitioning devices between different states based on determined potential activity in an area. For example, multiple cameras may be positioned at different locations within a materials handling facility to monitor areas within the materials handling facility. A camera may be positioned to obtain images of an inventory location that can be processed to determine if an item has been picked or placed at the inventory location. To reduce power consumption, the camera may be powered down, hibernated, put into a sleep mode, or otherwise placed into a low or lower power state (generally referred to herein as an "inactive state") when there is no activity (e.g., movement) at the inventory location. While some devices are in an inactive state, an inventory management system may utilize other devices to monitor activity in other areas of the materials handling facility. Data from those other input devices may be processed to determine a potential for activity to occur in an area associated with a currently inactive device. If potential activity is detected, the camera and/or other devices in the area of potential activity may be transitioned to an operational or full power state (generally referred to herein as an "active state") before the potential activity occurs, so that data (e.g., video, images) relating to the activity can be obtained by the device.

By transitioning devices between inactive states and active states, based on monitored activity and determined potential activity, power consumption within a materials handling facility can be reduced. Likewise, by transitioning to an active state when potential activity is detected, an occurrence of the activity can still be obtained and recorded by the device.

Also described is the ability to selectively transmit data from an input device within a materials handling facility to a remote computing resource for processing. Continuing with the above example, when the input device (e.g., camera) transitions to an active state, it may begin obtaining data (recording video) of the inventory location. Rather than sending all the obtained data to remote computing resources for processing and/or attempting to fully process the data locally (e.g., to determine an action, such as an item pick or an item place), the obtained data may be temporarily stored in a local memory or buffer of the input device or a locally connected computing system. An initial processing may also be performed locally with respect to the buffered data to determine if there is any activity at the inventory location. For example, if the data is video, adjacent frames of the video may be compared to determine if there is any change at the inventory location. If a change is detected, it may be determined that the change is representative of an activity at the inventory location. When an activity is determined, a portion of the buffered data may be sent to a remote computing resource(s) and data obtained by the input device may be sent to the remote computing resource as it is obtained.

While sending data as it is obtained to the remote computing resource, the obtained data may also be processed by the input device and/or a local compute system to determine when the activity has terminated at the inventory location. When the activity is determined to be terminated, a defined amount of data (e.g., a defined number of frames of video, duration of video) obtained after it is determined that the activity has terminated may be sent to the remote computing resource(s) and then transmission from the input device may cease until another activity is detected.

By controlling when and what data is transmitted from the materials handling facility to a remote computing resource, the amount of bandwidth and processing power consumed is reduced. For example, if there are thousands of cameras in a materials handling facility, it would require several gigabits per second to transmit data from all of the cameras to a remote computing resource. Likewise, it would require substantial remote computing resources to access each file and perform initial analysis to determine if an activity is occurring. By only transmitting data that is potentially interesting (e.g., it is data representative of an activity), the bandwidth required for transmission and the remote computing resources are substantially reduced.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. An item pick, as used herein, is a pick of an item from an inventory location. In a similar manner, an item place is a placement of an item at an inventory location.

An implementation of a materials handling facility configured to store and manage inventory items is illustrated in FIG. 1. As shown, a materials handling facility 100 includes a receiving area 120, an inventory area 130 configured to store an arbitrary number of inventory items 135A-135N, and one or more transition areas 140. The arrangement of the various areas within materials handling facility 100 is depicted functionally rather than schematically. For example, in some implementations, multiple different receiving areas 120, inventory areas 130 and transition areas 140 may be interspersed rather than segregated. Additionally, the materials handling facility 100 includes an inventory management system 150 configured to interact with each of receiving area 120, inventory area 130, transition area 140 and/or users within the materials handling facility 100.

The materials handling facility 100 may be configured to receive different kinds of inventory items 135 from various suppliers and to store them until a user orders or retrieves one or more of the items. The general flow of items through the materials handling facility 100 is indicated using arrows. Specifically, as illustrated in this example, items 135 may be received from one or more suppliers, such as manufacturers, distributors, wholesalers, etc., at receiving area 120. In various implementations, items 135 may include merchandise, commodities, perishables, or any suitable type of item depending on the nature of the enterprise that operates the materials handling facility 100.

Upon being received from a supplier at receiving area 120, items 135 may be prepared for storage. For example, in some implementations, items 135 may be unpacked or otherwise rearranged, and the inventory management system 150 (which, as described below, may include one or more software applications executing on a computer system) may be updated to reflect the type, quantity, condition, cost, location or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135, such as bulk products, commodities, etc., may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within inventory area 130 at an inventory location on an inventory shelf. In some implementations, like items 135 may be stored or displayed together in bins, on shelves or via other suitable storage mechanisms, such that all items 135 of a given kind are stored in one location. In other implementations, like items 135 may be stored in different locations. For example, to optimize retrieval of certain items 135 having high turnover or velocity within a large physical facility, those items 135 may be stored in several different locations to reduce congestion that might occur at a single point of storage.

When a user order specifying one or more items 135 is received, or as a user progresses through the materials handling facility 100, the corresponding items 135 may be selected or "picked" from the inventory area 130. For example, in one implementation, a user may have a list of items to pick and may progress through the materials handling facility picking items 135 from the inventory area 130. In other implementations, materials handling facility employees (referred to herein as users) may pick items 135 using written or electronic pick lists derived from orders. In some instances, an item may need to be repositioned from one location within the inventory area 130 to another location. For example, in some instances, an item may be picked from its inventory area, moved a distance and placed at another location.

Figure 2:
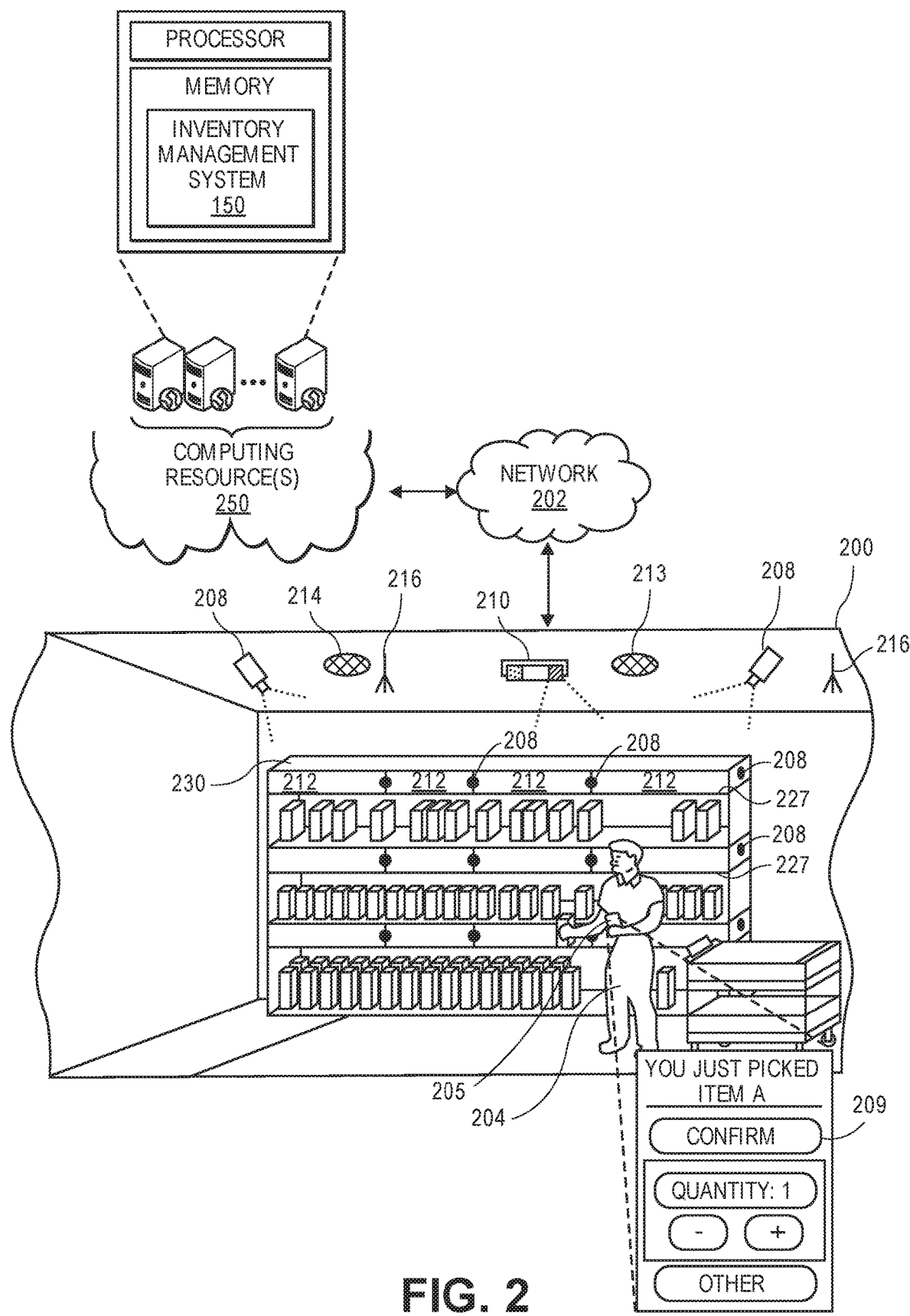
FIG. 2 shows additional components of the materials handling facility of FIG. 1, according to an implementation.

FIG. 2 shows additional components of a materials handling facility 200, according to one implementation. Generally, the materials handling facility 200 may include a variety of input devices to collect data. For example, one or more cameras 208 may be positioned in locations of the materials handling facility 200 so that images or video (data)

of locations, items, and/or users within the materials handling facility can be captured. In some implementations, the image capture devices 208 may be positioned overhead, such as on the ceiling, to capture images of users and/or locations within the materials handling facility. In addition, in some implementations, one or more cameras 208 may be positioned on or inside of inventory areas 230 and/or at respective inventory locations within an inventory area. For example, a series of cameras 208 may be positioned on external portions of the inventory areas 230 and positioned to capture images of users, the location surrounding the inventory area 230, and/or an inventory location on an opposing shelf. Likewise, one or more multiple-camera apparatus 227 may be positioned within the inventory areas (e.g., shelves) and cameras positioned at respective inventory locations to capture images of items stored at inventory locations within the inventory area 230.

Any type of camera and/or configuration of cameras may be used with the implementations described herein. For example, one or more of the cameras may be a red, green, blue ("RGB") color, still cameras, motion capture/video cameras, etc. In other implementations, one or more of the cameras may be depth sensing cameras, RGBD cameras, etc. As discussed further below, in some implementations, cameras may be paired to provide stereo imagery and depth information for items located on inventory shelves within the materials handling facility, to monitor users within the materials handling facility, etc. In other implementations, the cameras may include depth sensors, such as ultrasonic sensors, laser sensors, radar distance measurement sensors, stadiametric sensors, parallax sensors, Lidar sensors, Sonar sensors, time-of-flight sensors, etc.

In addition to cameras and/or depth sensors, other input devices, such as pressure sensors, scales, light curtains, load cells, radio frequency identification ("RFID") readers, etc., may be utilized with the implementations described herein. For example, a pressure sensor and/or a scale may be used to detect the presence or absence of items and/or to determine when an item is added and/or removed from an inventory location. Likewise, a light curtain may be positioned to cover the front of an inventory location and detect when an object (e.g., a user's hand) passes into or out of the inventory location. The light curtain may also include a reader, such as an RFID reader, that can detect an RFID tag included on an item as the item passes into or out of the inventory location. For example, if the item includes an RFID tag, an RFID reader may detect the RFID tag as the item passes into or out of the inventory location. Alternatively, or in addition thereto, the inventory shelf may include one or more antenna elements coupled to an RFID reader that are configured to read RFID tags of items located on the inventory shelf.

When a user 204 arrives at the materials handling facility 200, one or more images of the user may be captured and processed. For example, the images of the user 204 may be processed to identify the user 204. This may be done using a variety of techniques, such as facial recognition, pattern matching, etc. In some implementations, rather than or in addition to processing images to identify the user 204, other techniques may be utilized to identify the user 204. For example, the user 204 may provide an identification (e.g., user name, password), the user may present an identifier (e.g., identification badge, card), an RFID tag in the possession of the user may be detected, a visual tag (e.g., barcode, bokode, watermark) in the possession of the user may be detected, biometrics may be utilized to identify the user, etc.

The captured images and/or other inputs may also be used to establish a user pattern for the user while located in the materials handling facility 200. The user pattern may identify an overall shape of the user and/or any distinguishing features of the user 204 (e.g., color of shirt, height) that may be used to assist in the identification and/or tracking of the user as they progress through the materials handling facility 200. Likewise, as the user moves through the materials handling facility, movement information (e.g., gait, speed, direction) may be determined and associated with the user pattern.

In some implementations, a user located in the materials handling facility 200 may possess a portable device 205 and obtain information about items located within the materials handling facility 200, receive confirmation that the inventory management system 150 has correctly identified items that are picked and/or placed by the user, receive requests for confirmation 209 regarding one or more actions, etc. Generally, the portable device 205 has at least a wireless module to facilitate communication with the inventory management system 150 and a display (e.g., a touch based display) to facilitate visible presentation to and interaction with the user. The portable device 205 may store a unique identifier and provide that unique identifier to the inventory management system 150 and be used to identify the user 204. In some instances, the portable device may also have other features, such as audio input/output (e.g., speaker(s), microphone(s)), video input/output (camera(s), projector(s)), haptics (e.g., keyboard, keypad, touch screen, joystick, control buttons) and/or other components.

In some instances, the portable device 205 may operate in conjunction with or may otherwise utilize or communicate with one or more components of the inventory management system 150. Likewise, components of the inventory management system 150 may interact and communicate with the portable device as well as identify the user, communicate with the user via other means and/or communicate with other components of the inventory management system 150.

Generally, the inventory management system 150 may include one or more input/output devices, such as imaging devices (e.g., cameras) 208, projectors 210, displays 212, speakers 213, microphones 214, multiple-camera apparatus 227, illumination elements (e.g., lights), pressure sensors, scales, etc., to facilitate communication between the inventory management system 150 and/or the user and detection of items, events and/or other actions within the materials handling facility 200. In some implementations, multiple input/output devices may be distributed within the materials handling facility 200. For example, there may be multiple imaging devices, such as cameras, located on the ceilings and/or cameras (such as pico-cameras) located in the aisles near the inventory items.

Likewise, the inventory management system 150 may also include one or more communication devices, such as wireless antennas 216, which facilitate wireless communication (e.g., WI-FI™, Near Field Communication (NFC), BLUETOOTH™) between the inventory management system 150 and other components or devices. The inventory management system 150 may also include one or more computing resource(s) 250, such as a server system, that may be local to the environment (e.g., materials handling facility), remote from the environment, or any combination thereof.

Figure 3:
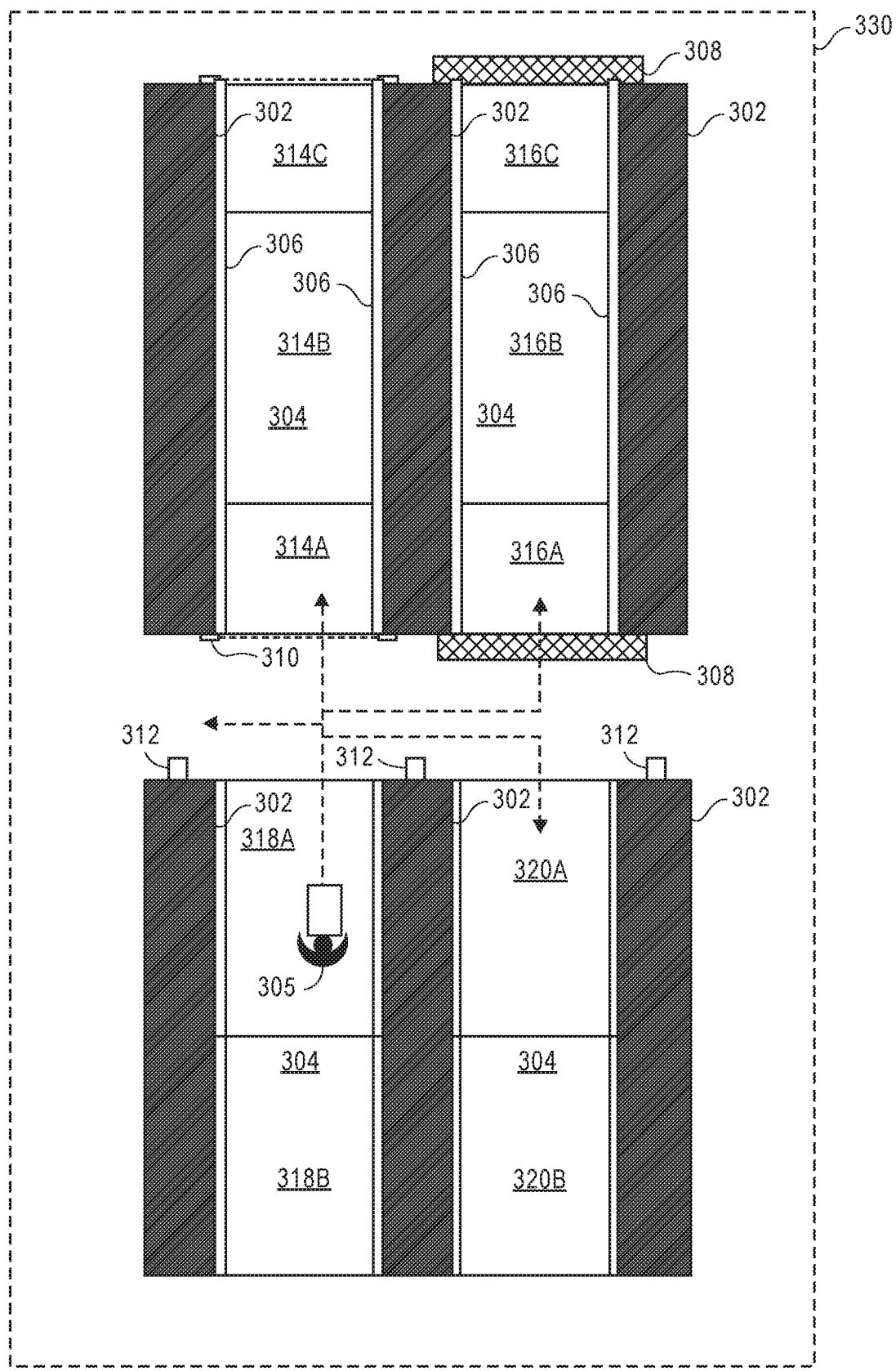
FIG. 3 is a top down view of a block diagram of a portion of an inventory area, according to an implementation.

FIG. 3 is a top down view of a block diagram of a portion of an inventory area 330, according to an implementation. In this illustration, there are six sets of shelves 302 aligned to form aisles 304. Users 305 may progress down aisles 304 and pick items from inventory locations on each of the inventory shelves 302. As discussed above, there may be any number of input/output devices located within the inventory area. In this example, there camera pairs (not shown) positioned on an underneath side of each inventory shelf and oriented to obtain images of an inventory location on a lower shelf. Likewise, there are front facing cameras 306 positioned on the front of each shelf and oriented to obtain images of an inventory location on a shelf on the opposite side of the aisle 304. Overhead cameras (not shown) may also be positioned over each aisle to obtain images of users and the inventory area.

Other input devices and/or output devices that may exist within the inventory area are pressure sensors and/or load cells on the shelves at each inventory location, pressure sensors or load cells 308 within the surface (e.g., floor) of the materials handling facility, presence detection sensors 310, RFID tag readers 312, microphones, displays, projectors, speakers, etc. As discussed above, each of the input devices and/or output devices may communicate with and be controlled by the inventory management system 150.

To conserve power, the input devices and/or output devices may be transitioned between an active state and an inactive state based on the presence or potential presence of activity within a proximity of the input device or the output device. For example, if the input device is a camera, the inventory management system may maintain the camera in an inactive state unless there is activity or a potential for activity within the field of view of the camera.

Because there may be a time requirement to transition an input device or an output device from an inactive state to an active state, the implementations discussed herein utilize monitored activity from one input device to determine if a second input device should be transitioned to an active state. For example, as a user 305 progresses through the inventory area 330, the overhead cameras having a field of view that includes the aisle in which the user is located may be maintained in an active state and obtain image data that is processed to monitor the location of the user.

As the user progresses down the aisle, other input devices and/or output devices may be transitioned between an inactive state and an active state depending on the potential for activity by the user 305. For example, all input devices and output devices within a defined distance (e.g., 15 feet) of the user 305 may be transitioned to an active state. As the user 305 moves out of an area, the inventory management system 150 may transition the input devices and/or output devices of that area back to an inactive state, thereby conserving power.

In some implementations, the defined distance may not be symmetrical and/or may depend on the user or the user pattern associated with the user. For example, input devices and output devices in the determined direction of travel of the user may be transitioned to an active state a farther distance from the user than input devices or output devices that are behind the user's direction of travel. Likewise, as the user moves through the materials handling facility, the speed or gait of the user may be monitored and input devices or output devices activated in the direction of travel of the user based on the speed of the user and the time required to transition those devices to an active state. For example, it may take longer to transition a display (output device) to an active state than to transition a pressure sensor (input device). If the user is walking at approximately three miles per hour (4.4 feet per second) and it takes approximately five seconds to transition the display to an active state, if it is determined that there is a potential for activity near the display by the user (e.g., based on the proximity of the user and/or the direction of travel of the user), when the user is approximately 25 feet from the display, the inventory management system may instruct the display to transition to an active state. In comparison, if it takes approximately one second to transition the pressure sensor to an active state, the inventory management system may not instruct the pressure sensor to transition to an active state until the user is approximately 6 feet away from the pressure sensor.

The inventory management system may maintain a transition table for different input devices or output devices identifying the average time required to transition the device from an inactive state to an active state and utilize that information to determine when to transition a device based on a potential for activity near the device. For example, the inventory management system may determine there is a potential for activity for all input devices and output devices in the aisle in which the use 305 is positioned. For each input device and output device within that aisle, the inventory management system may monitor the distance of the user from the device and determine when to instruct the device to transition to an active state based on the location of the user and the time required to transition the device.

In other implementations, blocks or segments of input devices or output devices may be transitioned to an active state based on the location of the user 305. For example, aisles may be segmented into blocks 314A, 314B, 314C, 316A, 316B, 316C, 318A, 318B, 320A, 320B. When the user is located in block 318A, the inventory management system 150 may instruct devices in adjacent blocks 318B, 314A, 316A, 320A to transition to an active state. As the user moves between blocks, the potential for activity in surrounding blocks is determined and corresponding devices transitioned between active states and inactive states.

The potential activity in adjacent blocks and/or at input/output devices may be determined based on a variety of factors. For example, the direction of travel of the user, the location of items picked by the user, the location of items that are often picked when items picked by the user are also picked, the location of items on a pick list associated with the user that are still to be picked by the user, the location of items offered for sale or advertisement, the location of high volume selling items, the location of items previously picked by the user, etc. In one implementation, a pick history and/or path of a user may be considered in determining the potential for activity in adjacent blocks and/or at different input/output devices. Likewise, in some implementations, paths that the user may follow to pick items may be recommended to the user. In such an implementation, the potential for activity may be based on the recommended path and/or whether the user is following the recommend path.

Because some input devices or output devices consume more power than others, in some implementations, a lower power input device may be positioned at locations (e.g., end of aisle) and maintained in an active state to monitor for activity. If activity is detected by the device, the inventory management system may instruct other adjacent devices to transition to an active state. For example, one or more low power input devices, such as a presence detection sensor 310, pressure sensor 308, RFID tag reader 312, may be positioned at the ends of aisles and maintained in an active state to monitor for activity. If an activity is detected, the inventory management system sends instructions to corresponding input devices or output devices to transition to an active state. For example, if the presence detection sensor 310 detects that a user is exiting the aisle 304, the inventory management system 150 may instruct input devices and output devices in adjacent aisles or adjacent blocks to transition to an active state.

In another example, input devices and output devices within a defined distance of the end of an aisle may be maintained in an active state. If activity is detected at the end of the aisle, the inventory management system may instruct an adjacent block of input devices and/or output devices within the aisle to transition to an active state. For example, input devices and output devices in block 314A may be maintained in an active state. If a user is detected entering the aisle, the inventory management system may instruct the adjacent block 314B within the aisle to transition to an active state.

In each of the examples discussed above with respect to FIG. 3, the inventory management system is utilizing activity detected at one input device to determine the potential for activity at another input device or output device. Based on the determined potential for activity, the inventory management system may instruct the input device or output device to transition between an active state and an inactive state. While the examples discuss two states, it will be appreciated that the implementations discussed herein are equally functional with multiple states for input devices and/or output devices. For example, some input devices or output devices may include a transition state that is between the inactive state and the active state. In such an example, an initial determination of potential activity may be made that results in the device being transitioned from an inactive state to a transition state. If the potential for activity increases the device may then be transitioned from the transition state to the active state. Conversely, if the potential for activity decreases, the device may be transitioned back to the inactive state.

By transitioning devices between states based on the potential for activity, the overall power consumed in the materials handling facility is reduced. Likewise, in portions of the materials handling facility that include temperature sensitive items (e.g., perishables), maintaining devices in an inactive state except when there is a potential for activity aids in the management of temperature at those areas.

Figure 4:
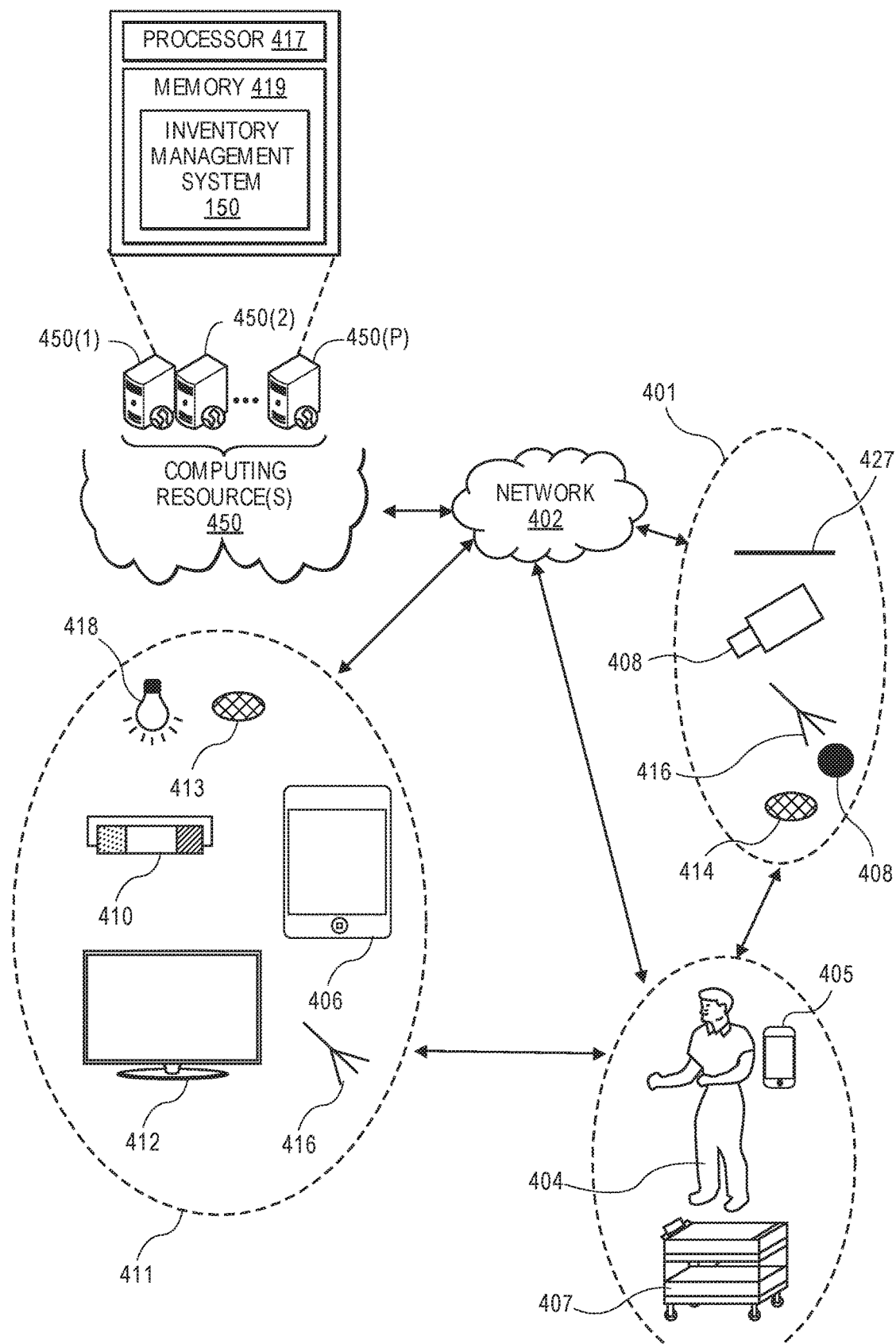
FIG. 4 shows components and communication paths between component types utilized in a materials handling facility of FIG. 1, according to an implementation.

FIG. 4 shows example components and communication paths between component types utilized in a materials handling facility 100, in accordance with one implementation. A portable device 405 may communicate and interact with various components of an inventory management system 150 over a variety of communication paths. Generally, the inventory management system 150 may include input components 401, output components 411 and computing resource(s) 450. The input components 401 may include an imaging device 408, a multiple-camera apparatus 427, microphone 414, antenna 416, or any other component that is capable of receiving input about the surrounding environment and/or from the user 404. The output components 411 may include a projector 410, a portable device 406, a display 412, an antenna 416, a radio (not shown), speakers 413, illumination elements 418 (e.g., lights), and/or any other component that is capable of providing output to the surrounding environment and/or the user 404.

The inventory management system 150 may also include computing resource(s) 450. The computing resource(s) 450 may be local to the environment (e.g., materials handling facility), remote from the environment, or any combination thereof. Likewise, the computing resource(s) 450 may be configured to communicate over a network 402 with input components 401, output components 411 and/or directly with the portable device 405, a user and/or the tote 407.

As illustrated, the computing resource(s) 450 may be remote from the environment and implemented as one or more servers 450(1), 450(2), . . . , 450(P) and may, in some instances, form a portion of a network-accessible computing platform implemented as a computing infrastructure of processors, storage, software, data access, and so forth that is maintained and accessible by components/devices of the inventory management system 150 and/or the portable device 405 via a network 402, such as an intranet (e.g., local area network), the Internet, etc. The server system 450 may process images of users to identify the user, process images of items to identify items, process images of inventory location to determine actions and/or items involved in an action, to count items at an inventory location, determine a location of items and/or determine a position of items. The server system(s) 450 does not require end-user knowledge of the physical location and configuration of the system that delivers the services. Common expressions associated for these remote computing resource(s) 450 include "on-demand computing," "software as a service (SaaS)," "platform computing," "network-accessible platform," "cloud services," "data centers," and so forth.

Each of the servers 450(1)-(P) include a processor 417 and memory 419, which may store or otherwise have access to an inventory management system 150, which may include or provide image processing (e.g., for user identification, item counting, and/or item identification), inventory tracking, and/or location determination.

The network 402 may utilize wired technologies (e.g., wires, universal serial bus ("USB"), fiber optic cable, etc.), wireless technologies (e.g., radio frequency, infrared, NFC, cellular, satellite, BLUETOOTH™, etc.), or other connection technologies. The network 402 is representative of any type of communication network, including data and/or voice network, and may be implemented using wired infrastructure (e.g., cable, CAT5™, fiber optic cable, etc.), a wireless infrastructure (e.g., RF, cellular, microwave, satellite, BLUETOOTH™, etc.), and/or other connection technologies.

Figure 5:
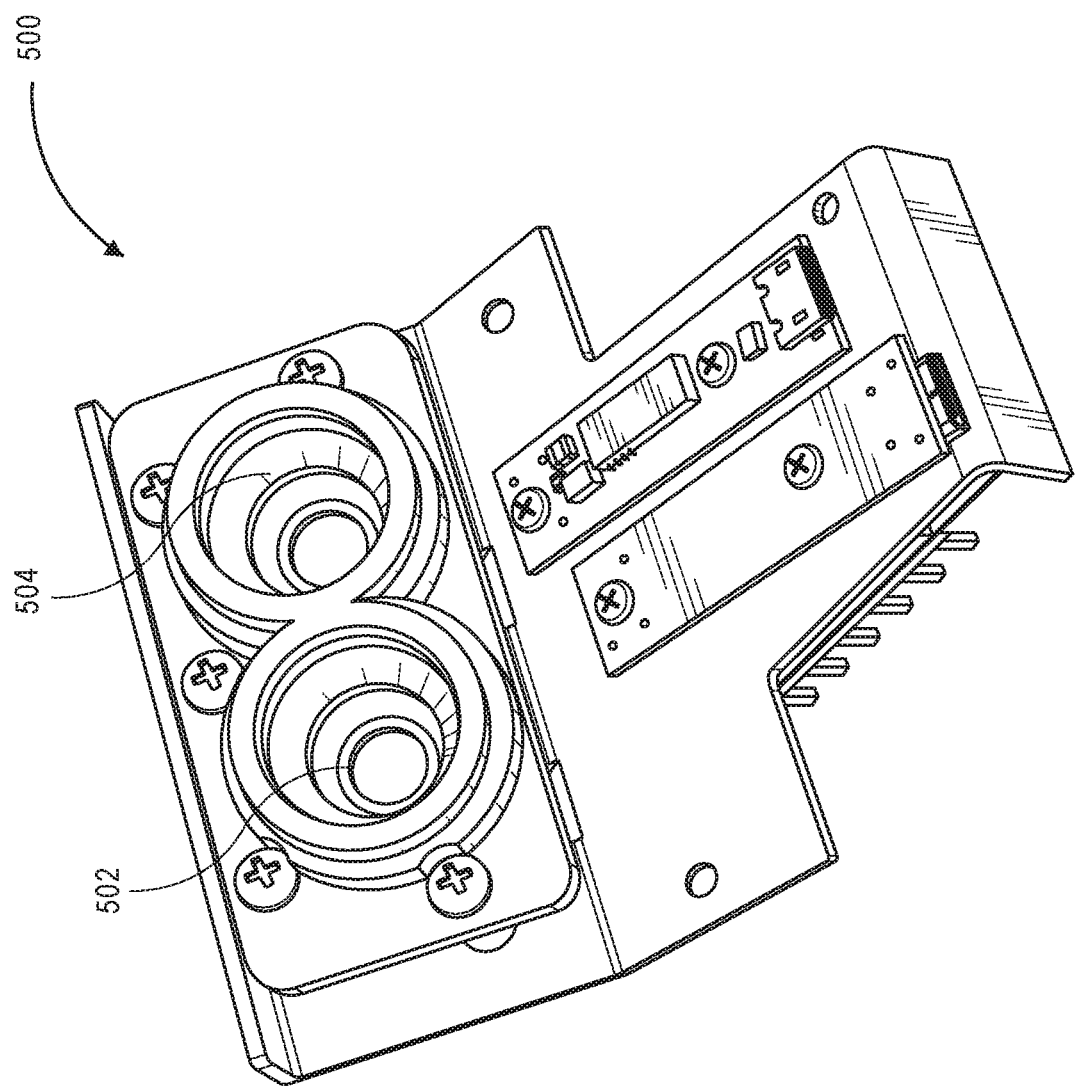
FIG. 5 is an illustration of a camera pair, according to one implementation.

FIG. 5 is an illustration of a camera pair 500, according to one implementation. The camera pair 500 may be formed as a single unit, as illustrated, and/or incorporated onto a mounting surface (not shown), such as a board or an inventory shelf, with other camera pairs 500. The cameras 502, 504 of the camera pair 500 are set at a fixed distance with respect to one another so that images obtained from each camera may be analyzed together to generate a depth map of the item(s) represented in the obtained images. For example, the cameras 502, 504 may be spaced approximately 6.35 centimeters apart.

By joining two individual cameras into a single camera pair 500, as illustrated, the lens may be securely mounted at fixed, known distances from one another so that image processing and depth maps can be accurately generated. Likewise, the cost of fabrication can be reduced through the common use of components. In some implementations, the camera pair 500 may also include an illumination element (light) that is used to illuminate an object that is to be recorded in an image.

Figure 6:
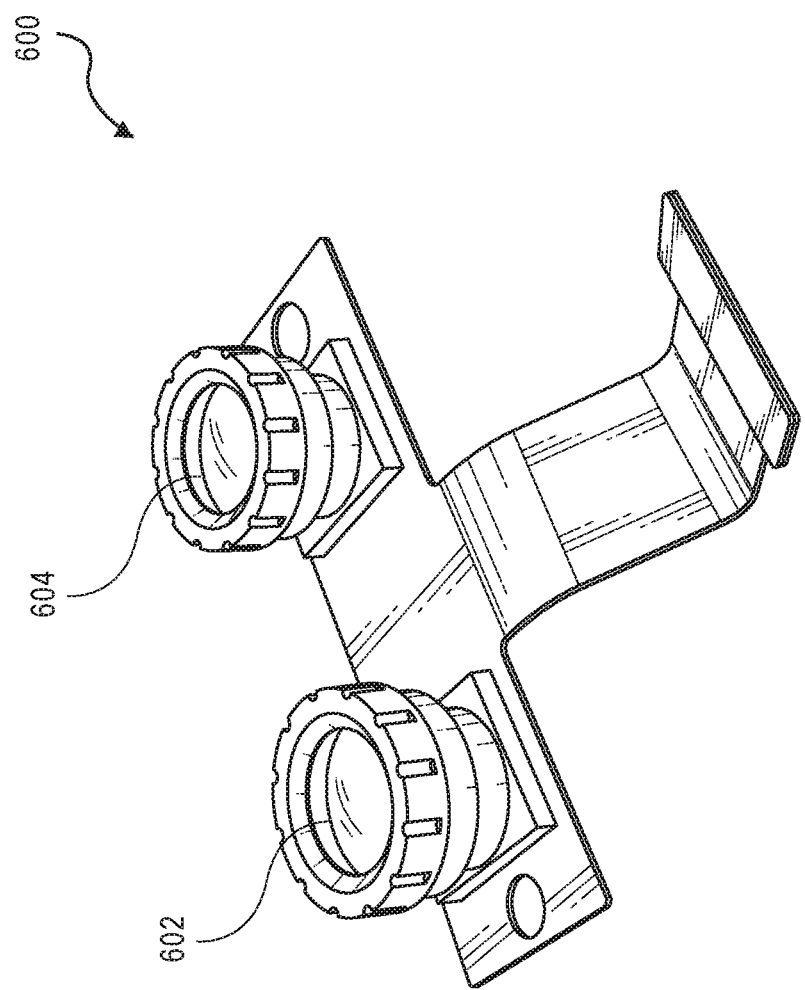
FIG. 6 is another illustration of a camera pair, according to one implementation.

FIG. 6 is another illustration of a camera pair 600, according to one implementation. The camera pair 600 may be formed as a single unit, as illustrated, and/or incorporated onto a mounting surface (not shown), such as a board or an inventory shelf, with other camera pairs 600. The cameras 602, 604 of the camera pair 600 are set at a fixed distance with respect to one another so that images obtained from each camera may be analyzed together to generate a depth map of the item(s) represented in the obtained images. For example, the cameras 602, 604 may be spaced approximately 6.35 centimeters apart.

By joining two individual cameras into a single camera pair 600, as illustrated, the cameras may be securely mounted at fixed, known distances from one another so that image processing and depth maps can be accurately generated. Likewise, the cost of fabrication can be reduced through the common use of components. As discussed further below with respect to FIGS. 7 and 8, the camera pair 600 is a simplified version of the camera pair 500 in which many of the device components have been consolidated or removed.

Figure 7:
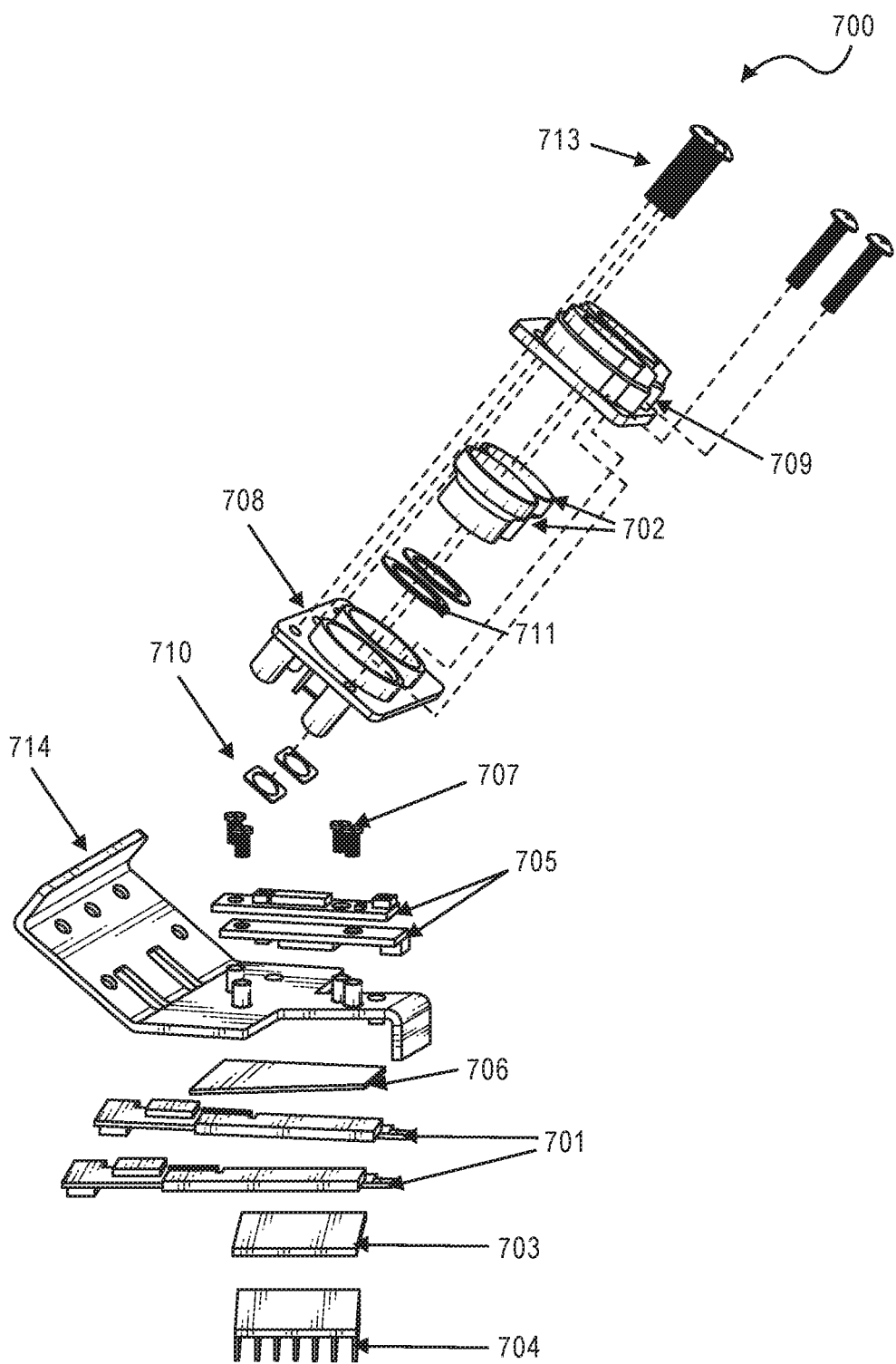
FIG. 7 is an illustration of a component view of a camera pair, according to one implementation.

FIG. 7 is an illustration of a component view of a camera pair 700, according to one implementation. The camera pair 700 provides a component view of the camera pair 500 (FIG. 5). The camera pair 700 may include a pair of camera modules 701. As illustrated, each lens 702 of the camera pair 700 may include its own camera module 701. Each camera module 701 may include an image sensor to convert an optical image obtained by the lens of the camera 702 into a digital signal or digital representation of the image (generally referred to herein as image data). In one implementation, each image sensor may be a RGB color sensor capable of supporting an image resolution of at least 860×480 at six frames per second (fps). Likewise, the image data may be stored in any variety of formats including, but not limited to YUYV, RGB, RAW, bmp, jpeg, etc. The camera module 701 may also include memory for buffering or storing image data.

Each camera module 701 may be thermally coupled to a heat sink 704 using a thermally conductive material 703, such as thermal tape, thermal gel, thermal grease, thermal compound, thermal paste, heat paste, heat sink paste, heat transfer compound, heat transfer paste (HTP), heat sink compound, etc. The thermally conductive material improves thermal transfer between the camera modules 701 and the heat sink 704. The thermally conductive material may comprise a ceramic, metal, carbon, graphite, liquid metal, phase change metal alloy (PCMA) and other similar materials. The heat sink 704 is positioned to dissipate heat away from the camera pair 700.

In some implementations, the camera modules 701 may also be affixed to the frame 714 of the camera pair 700 using a thermally conductive material 706, either alone or in conjunction with other mounting hardware (e.g., screws). Similar to the thermally conductive material 703, the thermally conductive material 706 improves the thermal transfer between the camera modules 701 and the frame 714. In such an implementation, the frame 714, which may also be formed of a thermally conductive material, may likewise be used as a heat sink to aid in the dissipation of heat away from the camera modules 701.

The frame 714 may be formed of any suitably rigid material such as graphite, carbon fiber, aluminum, sheet metal, steel, plastic, etc., or any combination thereof. The frame 714 provides a rigid surface to which components of the camera pair 700 may be mounted. Likewise, the frame 714 may be used to mount or otherwise secure the camera pair 700 to a mounting surface, such as an inventory shelf, mounting board, or any other surface.

Each camera 702 of the camera pair 700 may also include an input/output interface 705 for facilitating data exchange. The input/output interface 705 may utilize any interface standard for facilitating data exchange. For example, the input/output interface may utilize a USB standard, such as USB 2.0 or USB 3.0. Alternatively, the input/output interface 705 may utilize the MIPI interface. The input/output interface 705 may be, as illustrated, a printed circuit board that includes a connector for physically connecting the cameras 702 of the camera pair 700 with other components, such as a graphics processing unit, CIC, computing system, etc. Likewise, power and/or instructions for controlling the cameras 702 of the camera pair may be received via the input/output interface 705. Each input/output interface 705 may be affixed to the frame 714. For example, each input/output interface may be mounted to the frame 714 using screws 707.

The cameras 702 may be secured to the camera pair 700 using a camera mount that includes a bottom mount 708 and a top mount 709. The camera mounts may be fabricated so that when the lenses 702 are mounted to form the camera pair 700 they are positioned at defined angles and distances with respect to each other. For example, the camera mounts 708, 709 may be fabricated so that a center point of the lenses 702 are approximately 6.35 centimeters apart from one another. By mounting the cameras 702 at a defined position with respect to one another, processing of the images may be done to generate a depth map that identifies distances between a center point of the camera pair 700 and the object(s) represented in the images.

The cameras 702 may be secured between the top mount 709 and the bottom mount 708 using screw 713 or types of fasteners. Likewise, the screws 713 may be utilized to secure the camera mounts 708, 709 to the frame 714. In some implementations foam pads 710, 711 may be utilized to reduce vibrations and further secure the lenses.

While the examples discussed herein describe the use of a pair of cameras 702 to generate a camera pair 700 to facilitate depth of field sensing, it will be appreciated that paired cameras are not required with the implementations discussed herein. For example, rather than using paired cameras, a camera with one or more lenses may be coupled with a light pattern generator (e.g., infrared light, visible light) that may be utilized to determine a depth map. Other distance determining elements (e.g., range finger, laser, sonar) may likewise be used to determine depth information. In still other implementations, depth information may not be utilized and received image data may be processed to determine items represented in the images, without regard to depth information. In some example, the camera pair may be a standard stereo camera, rather than two lenses paired together to form the camera pair.

Figure 8:
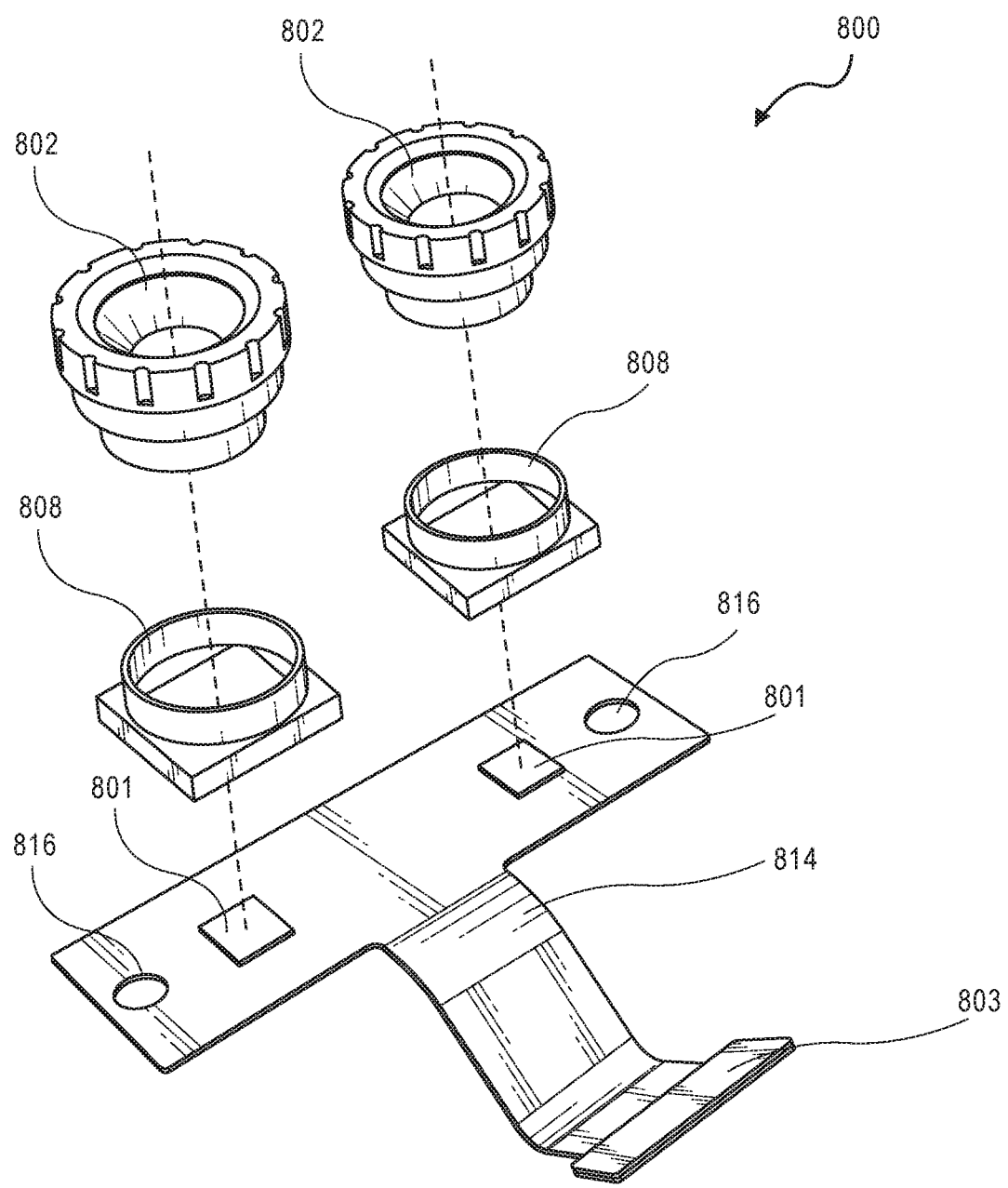
FIG. 8 is another illustration of a component view of a camera pair, according to one implementation.

FIG. 8 is an illustration of a component view of a camera pair 800, according to one implementation. The camera pair 800 provides a component view of the camera pair 600 (FIG. 6). As mentioned above, many of the components of the camera pair 800, compared to camera pair 700, have been removed or simplified.

As illustrated, each camera 802 of the camera pair 800 may include its own image sensor 801 to convert an optical image obtained by the lens of the camera 802 into a digital signal or digital representation of the image (generally referred to herein as image data). In contrast to camera pair 700, in which the sensors were incorporated into separate camera modules 701, the sensors 801 of the camera pair 800 may be incorporated directly onto the frame 814. As discussed below, the frame 814 may be a flexible circuit board.

In one implementation, each image sensor 801 may be a RGB color sensor capable of supporting an image resolution of at least 860×480 at six frames per second (fps). Because the implementation of the camera pair 800 does not perform processing on the camera pair 800, there is no need to heat sink as the heat generated from the lenses and sensors is minimal.

In this implementation, the frame 814 may be a flexible circuit to allow direct connection of the image sensors 801 and cameras 802. The frame may include one or more mount points 816 so that the frame can be mounted to other surfaces, such as the underneath side of an inventory shelf. The frame 814 may also include a stiffener 803 that includes a board to board connection, such as a thirty-pin connection, so that the frame 814 can be coupled to a multiple camera apparatus, such as the multiple camera apparatus discussed below, and/or other components, such as a graphics processing unit, CIC, computing system, memory, etc. Likewise, power and/or instructions for controlling the cameras 802 of the camera pair 800 may be received via the board to board connector.

The cameras 802 may be secured to the camera pair 800 using a camera housing 808. The camera housing 808 may be mounted to the frame 814 at defined angles and distances with respect to each other. For example, the camera housings 808 may be mounted to the frame 814 so that a center point of the cameras 802 are approximately 6.35 centimeters apart from one another. By mounting the cameras 802 at a defined position with respect to one another, processing of the images may be done to generate a depth map that identifies distances between a center point of the camera pair 800 and the object(s) represented in the images. The cameras 802 may be screwed into and/or friction fit into the cameras housings 808.

While the examples discussed herein describe the use of a pair of cameras to generate a camera pair 800 to facilitate depth of field sensing, it will be appreciated that paired cameras are not required with the implementations discussed herein. For example, rather than using paired cameras, a camera with one or more lenses may be coupled with a light pattern generator (e.g., infrared light, visible light) that may be utilized to determine a depth map. Other distance determining elements (e.g., range finger, laser, sonar) may likewise be used to determine depth information. In still other implementations, depth information may not be utilized and received image data may be processed to determine items represented in the images, without regard to depth information. In some example, the camera pair may be a standard stereo camera, rather than two cameras paired together to form the camera pair.

With the implementations discussed herein, one the camera pair 700, 800 is mounted at a location, the cameras may be calibrated and aligned with each other and the location. For example, if the camera pair 700, 800 is mounted to an underneath side of an inventory shelf and oriented to capture images of the shelf below, a marker or other identifier may be placed on the shelf in a field of view of both cameras of the camera pair 700, 800. Utilizing the marker, the cameras may be adjusted with respect to one another so that the pixel information for the marker is aligned and known for each camera.

Figure 9:
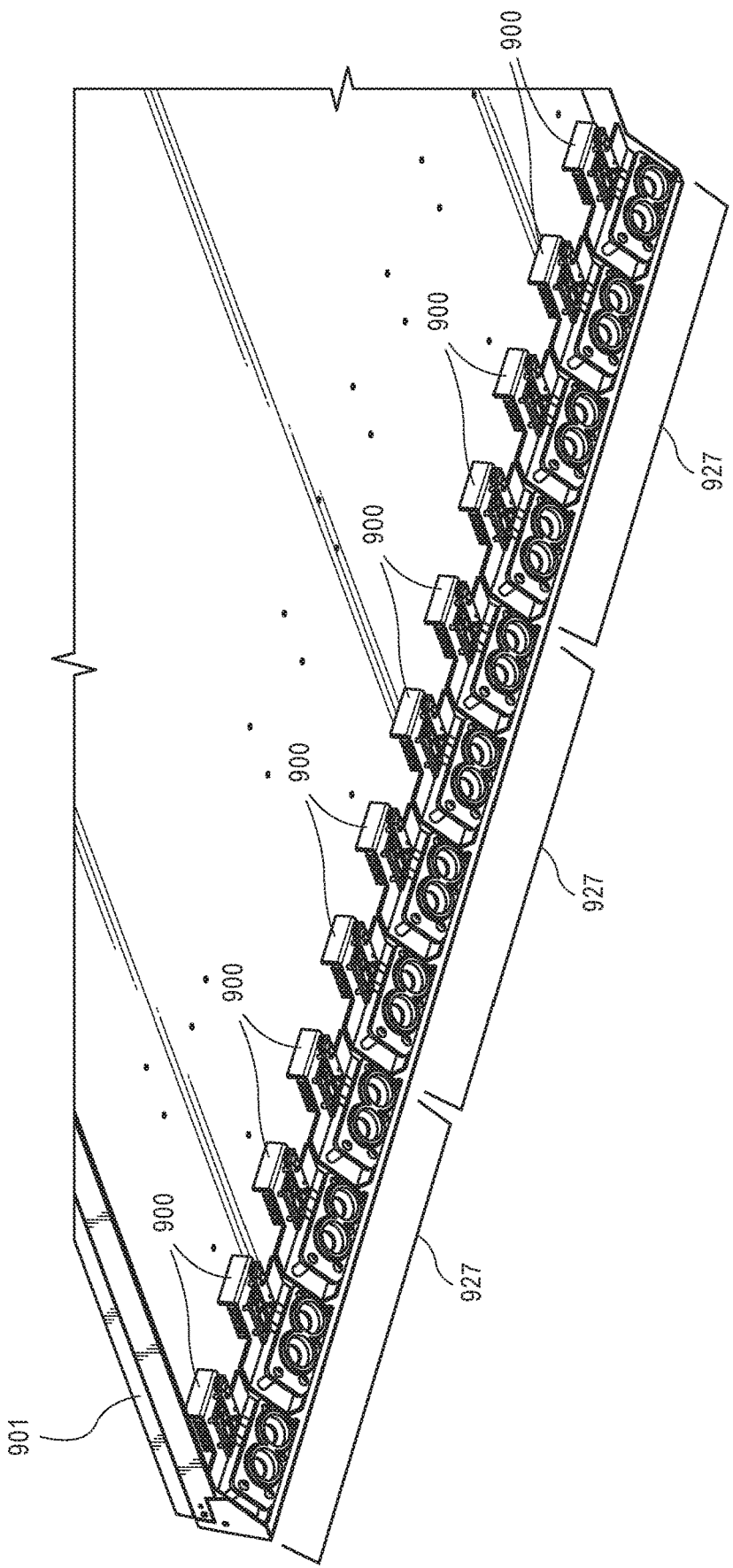
FIG. 9 is an illustration of three multiple-camera apparatus mounted to an underneath side of an inventory shelf, according to one implementation.

FIG. 9 is an illustration of three multiple-camera apparatus 927 mounted to an underneath side of an inventory shelf 901 along the front edge of the inventory shelf, according to one implementation. The illustration in FIG. 9 shows a configuration in which the camera pairs 500 (FIG. 5) are utilized. Each multiple-camera apparatus 927 may be configured as a single mounting surface (not show) to which each of the camera pairs 900 are mounted. The mounting surface, as discussed further below, may also include one or more graphics processing units, CICs and/or other components for processing, storing and/or routing image data generated by the camera pairs 900. Alternatively, each camera pair 900 may be mounted directly to the underneath side of the inventory shelf 901 and communicatively coupled to a corresponding mounting surface, graphics processing unit(s), CICs, etc. through the input/output interfaces 705 (FIG. 7) of the camera pair 900. As will be appreciated, multiple different configurations of a multiple-camera apparatus may be envisioned with different components included on a mounting surface, directly as part of the camera pair 900, separately mounted to the inventory shelf, etc. For example, in one implementation, the inventory shelf 901 may operate as the mounting surface and all components of the multiple-camera apparatus may be mounted to the inventory shelf 901.

In some implementations, a protective shield or barrier may be positioned in front of the camera pairs 900 to protect them from external forces, including humidity, inventory items, and/or users. Likewise, a heating element may also be included in the multiple-camera apparatus and/or the cameras may be sealed behind the protective shield to aid in the reduction of humidity due to temperate changes (e.g., the opening of a door to a refrigerated inventory area). In some implementations, the camera pairs 900 may be mounted to the underneath side of the inventory shelf 901 at defined positions. In other implementations, the camera pairs 900 may be mounted to the underneath side of the inventory shelf 901 such that they can be horizontally adjusted. Likewise, the angle of the lenses of the camera pairs 900 may be fixed or adjustable.

In one implementation, the camera pairs 900 may be positioned at defined distances with respect to other camera pairs 900 so that each camera pair 900 is approximately a same distance from adjacent camera pairs 900. For example, the camera pairs 900 may each be horizontally separated by approximately two inches. The separation between the camera pairs 900 may be determined based on the field of view of the camera pairs 900 and/or the spacing between rows of items on the inventory shelf. For example, it may be desirable to separate the camera pairs 900 so that the field of view of each camera pair 900 overlaps the field of view of adjacent camera pairs 900 so there are no locations on the inventory shelf that are not covered by the field of view of at least one camera pair 900. Likewise, if each row of inventory items is spaced a defined distance apart, the camera pair 900 may be similarly spaced so that the field of view of each camera pair 900 corresponds with a row of items.

For example, referring back to FIG. 2, the inventory items 235 are each approximately equally spaced horizontally along the inventory shelf 203. In such an implementation, the camera pairs of each of the multiple-camera apparatus 227 mounted to the underneath side of the inventory shelf 201 may be similarly spaced so that each camera pair is approximately in-line with a row of inventory items 235. As mentioned above, the spacing of the rows of inventory items 235 may be defined for a first inventory shelf 203 and the camera pairs of the multiple-camera apparatus may be mounted in a fixed position on the underneath side of a second inventory shelf 201 that is above the first inventory shelf, so that they are similarity spaced. Alternatively, the camera pairs may be horizontally adjustable along the length of the inventory shelf 201 so that if the configuration or distance between rows of inventory items changes, the camera pairs may be horizontally adjusted so they remain in-line with a row of an inventory item.

Figure 10:
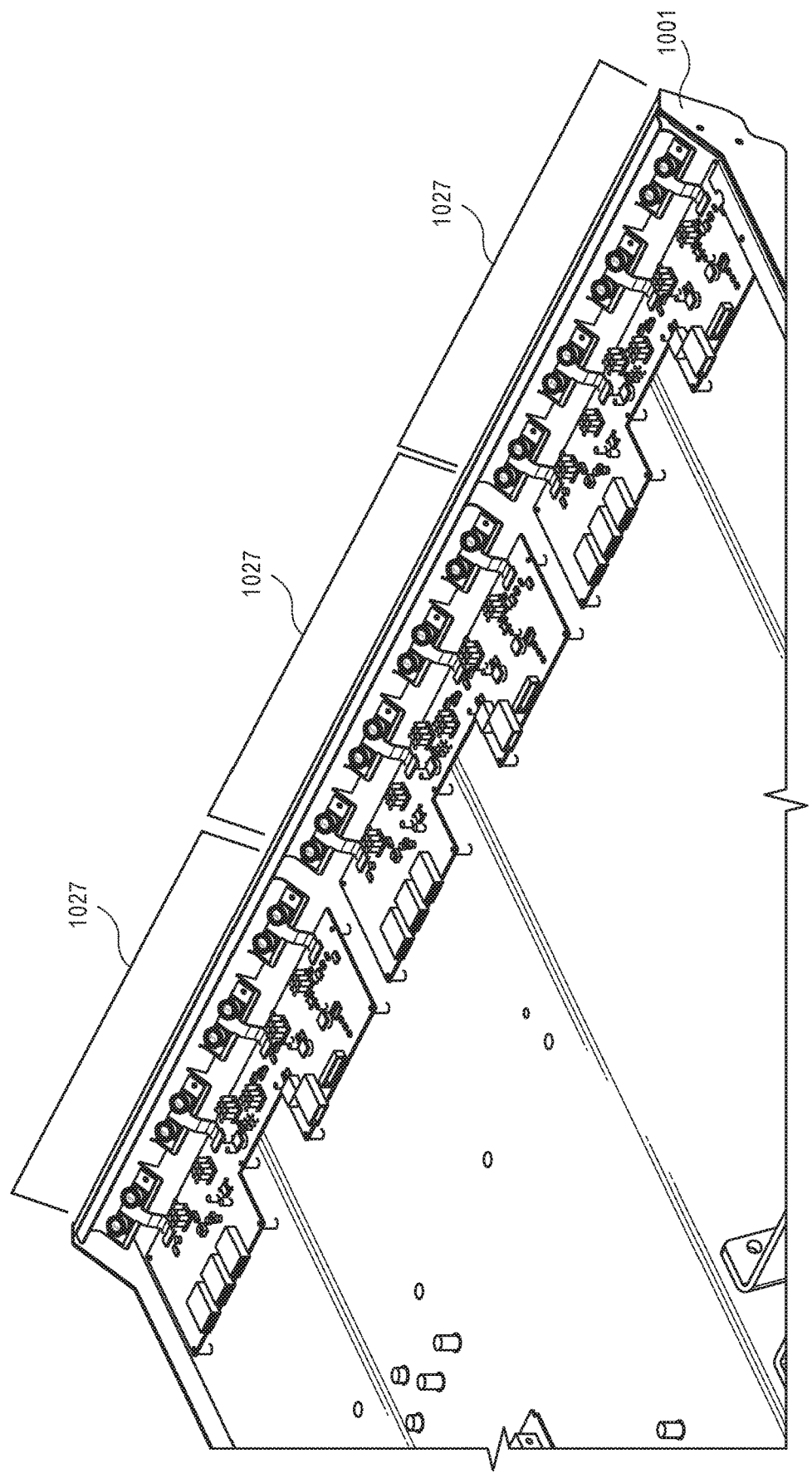
FIG. 10 is another illustration of three multiple-camera apparatus mounted to an underneath side of an inventory shelf, according to one implementation.

FIG. 10 is an illustration of three multiple-camera apparatus 1027 mounted to an underneath side of an inventory shelf 1001 along the front edge of the inventory shelf, according to one implementation. The illustration in FIG. 10 shows a configuration in which the camera pairs 600 (FIG. 6) are utilized. Each multiple-camera apparatus 1027 may be configured as a single mounting surface (not show) to which each of the camera pairs 1000 are mounted or coupled. The mounting surface, as discussed further below, may also include one or more graphics processing units, CICs and/or other components for processing, storing and/or routing image data generated by the camera pairs 1000. Alternatively, each camera pair 1000 may be mounted directly to the underneath side of the inventory shelf 1001 and communicatively coupled to a corresponding mounting surface, graphics processing unit(s), CICs, etc. through a board to board connector of the camera pair 1000. As will be appreciated, multiple different configurations of a multiple-camera apparatus may be envisioned with different components included on a mounting surface, directly as part of the camera pair 1000, separately mounted to the inventory shelf, etc. For example, in one implementation, the inventory shelf 1001 may operate as the mounting surface and all components of the multiple-camera apparatus may be mounted to the inventory shelf 1001.

In some implementations, a protective shield or barrier may be positioned in front of the camera pairs 1000 to protect them from external forces, including humidity, inventory items, and/or users. Likewise, a heating element may also be included in the multiple-camera apparatus and/or the cameras may be sealed behind the protective shield to aid in the reduction of humidity due to temperate changes (e.g., the opening of a door to a refrigerated inventory area). In some implementations, the camera pairs 1000 may be mounted to the underneath side of the inventory shelf 1001 at defined positions. In other implementations, the camera pairs 1000 may be mounted to the underneath side of the inventory shelf 1001 such that they can be horizontally adjusted. Likewise, the angle of the lenses of the camera pairs 1000 may be fixed or adjustable.

In one implementation, the camera pairs 1000 may be positioned at defined distances with respect to other camera pairs 1000 so that each camera pair 1000 is approximately a same distance from adjacent camera pairs 1000. For example, the camera pairs 1000 may each be horizontally separated by approximately two inches. The separation between the camera pairs 1000 may be determined based on the field of view of the camera pairs 1000 and/or the spacing between rows of items on the inventory shelf. For example, it may be desirable to separate the camera pairs 1000 so that the field of view of each camera pair 1000 overlaps the field of view of adjacent camera pairs 1000 so there are no locations on the inventory shelf that are not covered by the field of view of at least one camera pair 1000. Likewise, if each row of inventory items is spaced a defined distance apart, the camera pair 1000 may be similarly spaced so that the field of view of each camera pair 1000 corresponds with a row of items.

Figure 11:
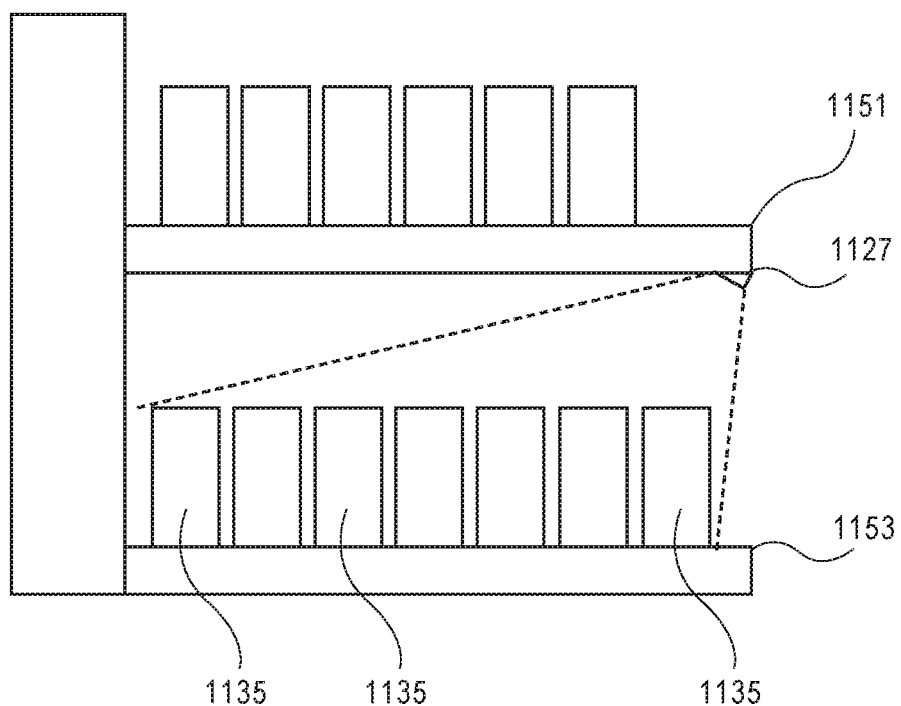
FIG. 11 is a block diagram of a side view of an inventory location, according to one implementation.

Referring now to FIG. 11, illustrated is a side view of two inventory shelves 1151, 1153, according to an implementation. One or more of the inventory shelves 1151, 1153 may support inventory items 1135 on a top side of the inventory shelf 1151, 1153. The inventory items may be arranged in rows extending from the back or rear of the top side of the inventory shelf to the front of the top side of the inventory shelf. One or more multiple-camera apparatus 1127 may be mounted to an underneath side of the inventory shelf 1151, 1153 and oriented so that the field of view of each camera is directed toward the top side of the inventory shelf below the inventory shelf to which the multiple-camera apparatus is mounted. For example, the multiple-camera apparatus 1127 is mounted to the underneath side of the upper inventory shelf 1151 and each of the camera pairs are positioned so that the field of view 1152 of the camera pairs are directed to the top side of the lower inventory shelf 1153, upon which inventory items 1135 are positioned.

In one implementation, the inventory shelves may be positioned so that the top of the inventory items 1135 are at least a defined distance from the camera pairs of the multiple-camera apparatus. For example, the inventory shelves 1151, 1153 may be positioned so that there is at least a two inch separation between the bottom of each camera pair of the multiple-camera apparatus 1127 and the top of the inventory items 1135.

By separating the top of the inventory items 1135 and the camera pairs by at least a defined distance, there is enough distance so that the camera pairs can focus on the inventory items 1135, the inventory items can be picked from the inventory shelf or placed into the inventory shelf without contacting the multiple-camera apparatus and so that more than one item in a row of inventory items is viewable by the camera pair. As illustrated by the field-of-view 1102 in FIG. 11, is some implementations, the lenses of the camera pair 900 may be wide angle lenses having a large field-of-view (e.g., greater than 80 degrees) and the camera pairs 900 may be positioned so that the field of view extends from the front of the inventory shelf 1153 to the back or rear of the inventory shelf. In such an implementation, at least a portion of each item in the row of inventory items may be viewable by at least one camera pair of a multiple-camera apparatus.

While the implementations discussed herein illustrate the use of two wide angle lenses in a paired configuration to enable viewing of items located on the shelf, in other implementations, additional cameras positioned at other locations on the underneath side of the shelf and/or multiple-camera apparatus positioned at different locations on the shelf may be utilized. For example, rather than having multiple-camera-apparatus only mounted to the underneath side of the inventory shelf and along the front edge, in some implementations, cameras may also be positioned along the rear of the underneath side of the inventory shelf facing toward the front of a lower inventory shelf to obtain images of items toward the rear of the shelf. In still another example, one or more cameras may be positioned near the cameras of the multiple-camera apparatus and oriented so that the field of view of the camera is directed toward the rear of the inventory shelf.

Figure 12:
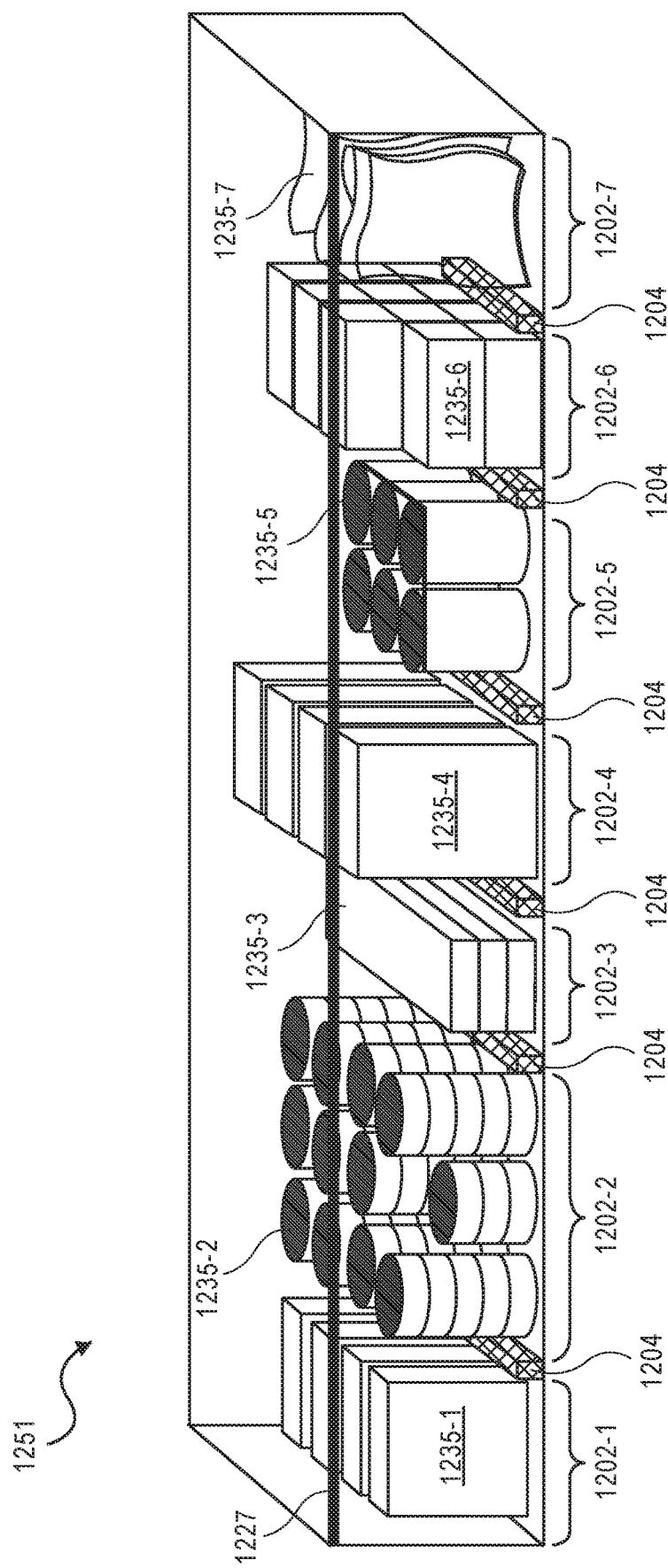
FIG. 12 is a block diagram of a front view of an inventory shelf, according to an implementation.

FIG. 12 is a block diagram of a front view of an inventory shelf 1251, according to an implementation. In this illustration, the upper shelf to which the multiple camera apparatus 1227 has been removed to facilitate discussion. The inventory shelf 1251 includes items 1235 positioned at defined inventory locations 1202. In this example, each inventory location is separated by a physical divider 1204. As discussed below, the physical dividers 1204 may provide a marker or identifier for camera alignment and/or to determine boundaries between inventory locations when processing images of items.

In this example, the camera pairs of each multiple-camera apparatus 1227 are mounted to the underneath side of the inventory shelf above the inventory shelf 1251 and aligned with each of the inventory locations 1202 so that the field of view of each camera includes the inventory items 1235 located at the inventory location 1202. As illustrated, inventory items 1235 within a materials handling facility may vary in size, shape, placement, color, etc. For example, inventory items 1235-1 located at inventory location 1202-1 have a width and a height that is more than their depth so they are positioned in a horizontally stacked configuration. With the distance between the top of the items 1235-1 and the multiple-camera apparatus 1227, the multiple camera apparatus is able to obtain an image that includes at least a portion of each item in the inventory location 1235-1. For example, a captured image would include the top and front of the first item and the top of each other item in the inventory location 1202-1.

The inventory items 1235-2 are smaller in shape and cylindrical. Due to their size and configuration they may be stacked vertically, horizontally and/or laterally in the inventory location 1202-2. By setting the maximum stack height to a defined value (e.g., 2 inches below the multiple-camera apparatus 1227), an image obtained by the camera of the multiple-camera apparatus 1227 that is aligned with the inventory location 1202-2 will include a representation of at least a top of each vertical stack of items 1235-2.

Inventory items 1235-3 located at inventory location 1202-3 have a width and a height that is less than their depth so they are positioned in a vertically stacked configuration. Because of the configuration of the items, an image obtained by the multiple camera apparatus 1227 may only include a representation of the item 1202-3 on top of the stack. Alternatively, the image may include the top of the top item on the vertical stack and possibly a portion of each front side of the items in the vertical stack.

Inventory items 1235-4 located at inventory location 1202-4 are similar to inventory items 1235-1, but may be taller such that an image obtained by the camera of the multiple-camera apparatus may only include a representation of the item 1235-4 at the front of the horizontal stack configuration.

Inventory items 1235-5 located at inventory location 1202-5 are multi-items that are treated as a single inventory item. In this example, six individual cylindrical items are joined and treated as a single inventory item 1235-5. The camera of the multi-camera apparatus 1227 aligned with the inventory location 1202-5 may obtain an image that includes all of the individual items. As discussed in further detail below, the implementations described herein may be configured to detect the group of items and treat them as a single inventory item for counting.

The inventory items 1235-6 are rectangular shaped. Due to their size and shape, they may be stacked both vertically and horizontally in the inventory location 1202-6. By setting the maximum stack height to a defined value (e.g., 2 inches below the multiple-camera apparatus 1227), an image obtained by the camera of the multiple-camera apparatus 1227 that is aligned with the inventory location 1202-6 will include a representation of at least a top of each stack of items 1235-6.

The inventory items 1235-7 are bags that may vary or alter in shape. In this configuration, the bags of items 1235-7 may be stacked horizontally, but varying amounts of each item may be visible to the camera of the multiple-camera apparatus 1227 aligned with the inventory location 1202-7.

Figure 16:
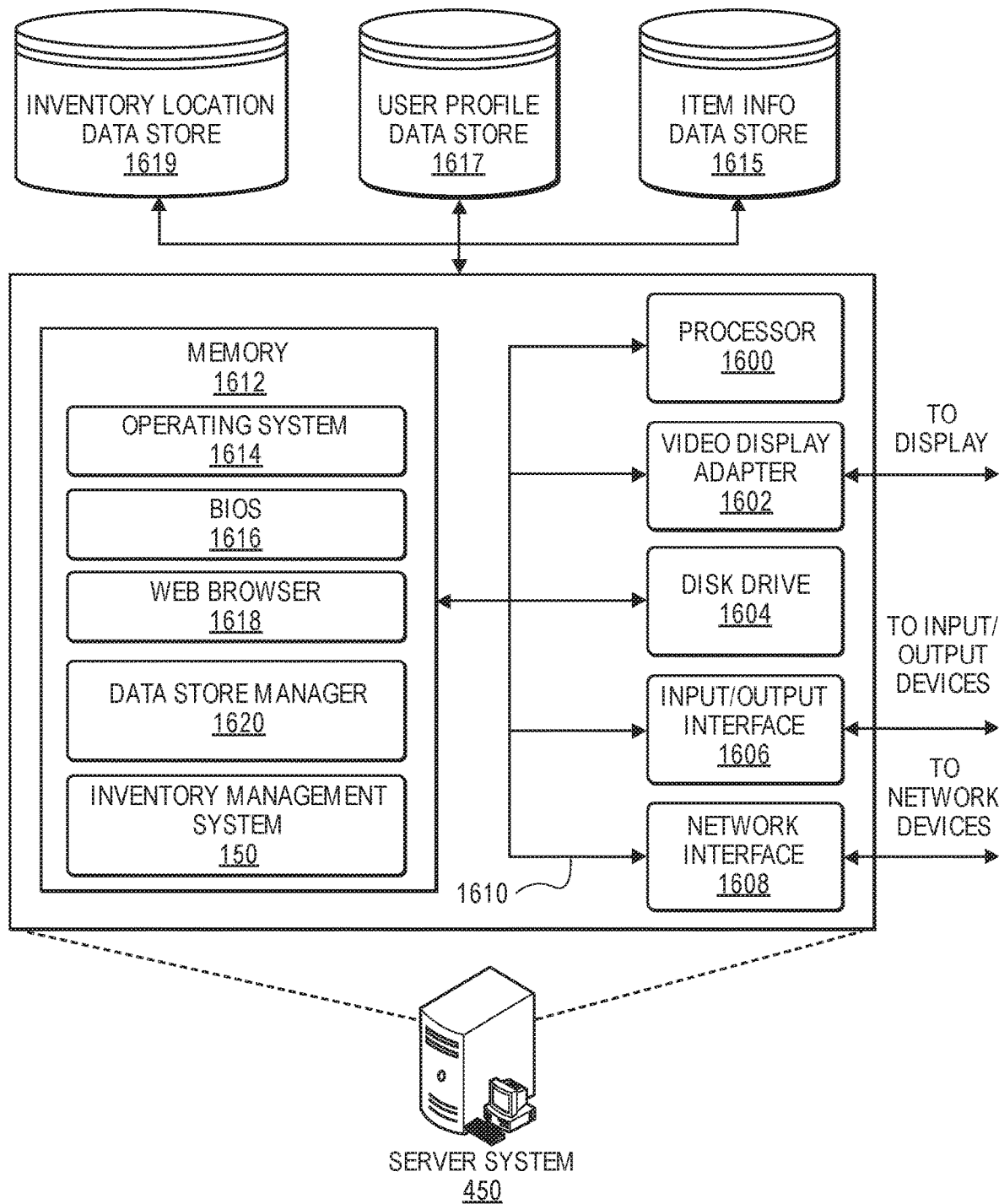
FIG. 16 is a block diagram of an illustrative implementation of a server system that may be used with various implementations.

The inventory management system maintains item information in the item information data store 1615 (FIG. 16). Item information may include any information about the item, such as the item type, size, shape, weight, dimensions (length, width, height), color, etc. As items 1235 are added to an inventory location 1202, the item type for the item placed at an inventory location is associated with the inventory location 1202. Likewise, item quantities may be added or updated as items are stocked or added into inventory locations. In some implementations, item type determination and/or item quantity at stocking may be provided by a user (e.g., stocking agent). Alternatively, or in addition thereto, images of the items as they are added to the inventory location may be detected and the item identified using one or more of feature detection, edge detection, etc. Likewise, quantities or item counts may be determined as items are added using the implementations described herein.

Figure 13:
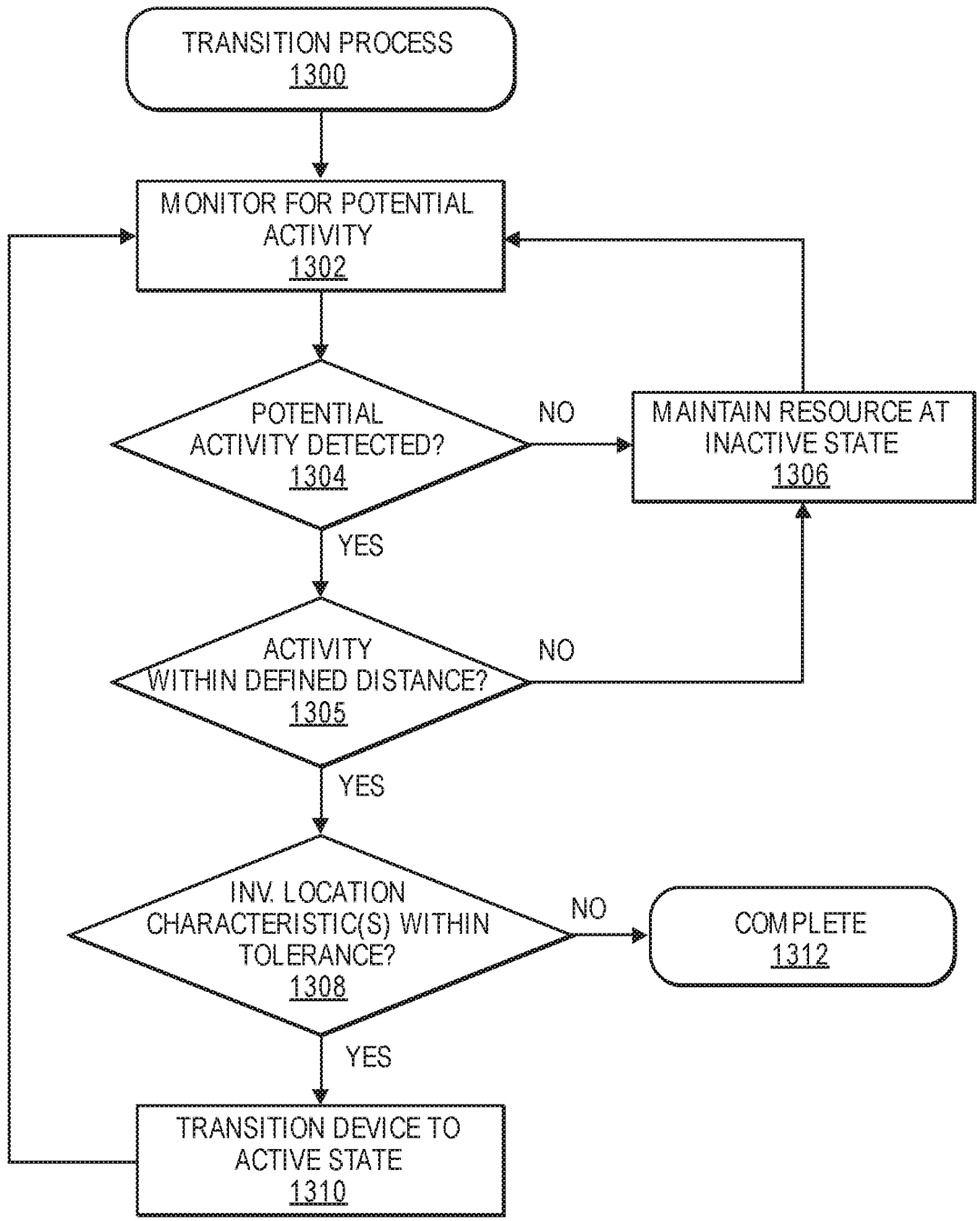
FIG. 13 is a flow diagram of an example transition process, according to an implementation.

FIG. 13 is a flow diagram of an example transition process 1300 for adding item information to an item information data store, according to an implementation. The process of FIG. 13 and each of the other processes and sub-processes discussed herein may be implemented in hardware, software, or a combination thereof. In the context of software, the described operations represent computer-executable instructions stored on one or more computer-readable media that, when executed by the one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 1300 begins by monitoring for potential activity, as in 1302. As discussed above with respect to FIG. 3, one or more input devices may be utilized to monitor for activity. When activity is detected by that input device, a potential for activity at other input devices or output devices is determined, as in 1304. In some implementations, potential activity may be determined when the likelihood of the potential activity exceeds a threshold. For example, the distance of the device from detected activity, the direction of travel of a user, the speed of travel of a user, the pick list associated with a user, the items in the inventory location associated with the input device or output device, etc., may all be considered to determine a potential for activity at the input device or output device.

If potential activity at the input device or output device is not detected, or does not exceed a defined threshold, the device is maintained or transitioned back to an inactive state, as in 1306, and the example process 1300 returns to block 1302 and continues. For example, if the device was in an active state recording activity of a user at the inventory location but the user has departed and moved far enough away from the inventory location that the potential for activity has decreased, the device may transition back to an inactive state. However, if potential activity is detected, it may be determined whether the user that may create the potential activity is within a defined distance of the input device or the output device, as in 1305. As discussed above, the time required to transition between an inactive state and an active state may vary for different types of devices. Some devices may only take milliseconds to transition while others may take several seconds or longer to transition from an inactive state to an active state. In other examples, rather than determining distances for specific devices, devices may be transitioned in groups or blocks and, when a user enters a block, input devices and output devices in adjacent blocks may be determined to be within a defined distance of the user and transitioned from an inactive state to an active state.

If it is determined that the user is not within a defined distance of the device, the example process 1300 returns to block 1306 and continues. If it is determined that the user is within a defined distance, it may be determined whether inventory location characteristics of the inventory location(s) associated with the input device or the output device are within a defined tolerance, as in 1308. For some inventory locations, there may be no defined tolerance and decision block 1308 may be omitted. However, for other inventory locations, there may be tolerances, such as temperature, that are to be maintained. For example, if the inventory location contains perishable items, the defined tolerance may be that the temperature of the inventory location is to be maintained within two degrees of the ambient temperature within the materials handling facility.

If it is determined that the inventory location characteristics of the inventory location(s) associated with the input device or the output device are within a defined tolerance, the input device or the output device are transitioned to an active state, as in 1310. Upon transitioning of the input device or the output device to an active state, the example process 1300 returns to block 1302 and continues.

Returning to decision block 1308, if it is determined that the inventory location characteristics are not within tolerance, the input device or the output device may not be transitioned and the example process 1300 may complete, as in 1312. In some implementations, there are more than one input device or output device located near an inventory location and the inventory management system may utilize input from those other devices to determine if an action was performed, as discussed above, rather than activating the device when the inventory location characteristics are not within the defined tolerance. In other implementations, the example process 1300 may continue monitoring for activity and rather than not transitioning the device to an active state, it may delay the transition to alter the period of time before transitioning the device to an active state. While such a delayed transition may result in a portion of the activity to not be recorded or obtained by the device, it may aid in keeping the inventory location characteristics close to tolerance. Likewise, even if a portion of the activity is recorded, the portion may be sufficient to determine if an action occurred, as discussed below.

When an input device is transitioned to the active state, it may begin obtaining data (e.g., video, images, weight/pressure measurements). Rather than attempting to fully process that data locally and/or send all of the data to remote computing resources for processing, the input devices may monitor for activity and only send data to remote computing resources when activity is actually detected.

Figure 14:
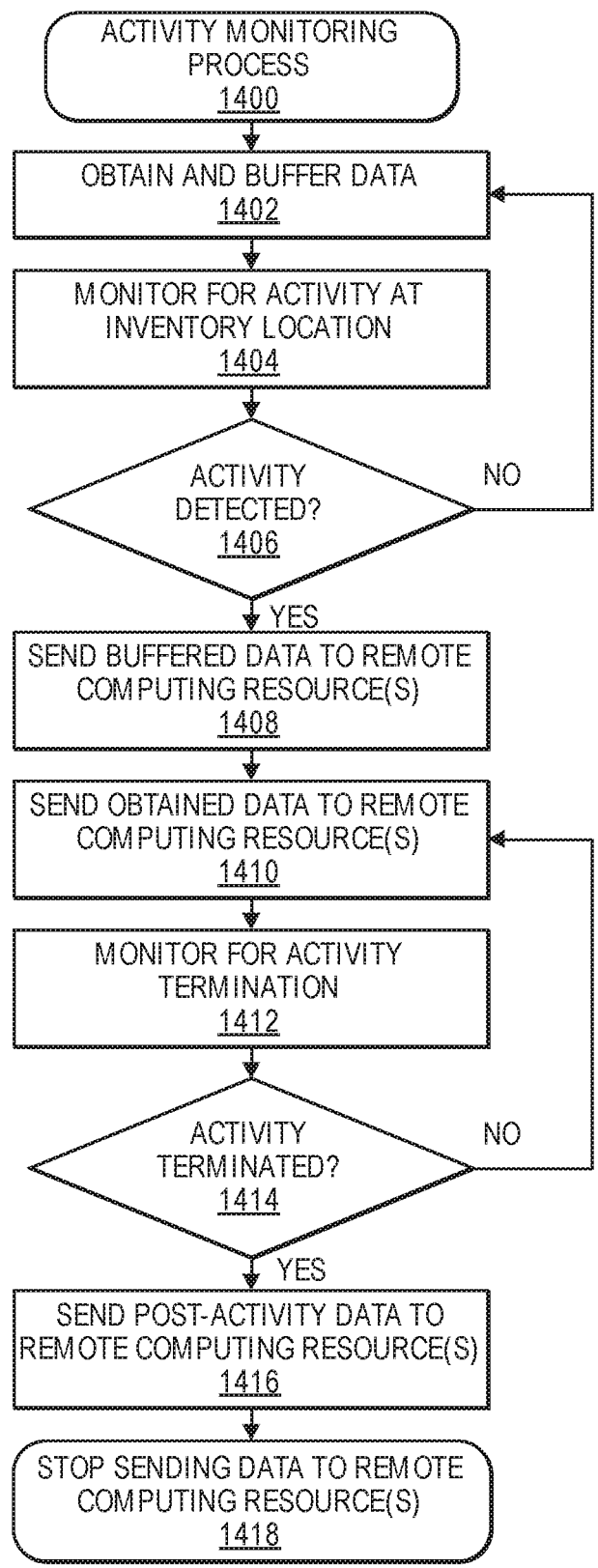
FIG. 14 is a flow diagram of an example activity monitoring process, according to an implementation.

FIG. 14 is a flow diagram of an example process 1400 for monitoring for activity, according to an implementation. The example process 1400 is performed locally within the materials handling facility by an input device and/or by a local computer system connected with the input device.

The example process 1400 begins by obtaining and buffering data obtained by the input device, as in 1402. The data may be any type of data related to an inventory location that may be captured by an input device. For example, the data may be images, video, audio, weight and/or pressure measurements, temperature, etc. In one implementation, the data is obtained from a camera pair in the form of video. In another implementation, the data is obtained for a load cell on the shelf of the inventory location in the form of weight measurements. Data may be buffered for a defined period of time (e.g., fifteen minutes) and then discarded if no activity has been detected at the inventory location, thereby reducing the storage requirements for maintaining data. The defined period of time for buffering data may vary for different inventory locations, different types of data, different types of input devices, etc.

The obtained and buffered data may be utilized to monitor for activity at the inventory location, as in 1404. For example, adjacent items of data may be compared to determine an amount of change at the inventory location. In one example, if the data is in the form of video, adjacent frames of video may be compared using a variety of techniques to determine if there has been a change (e.g., movement) at the inventory location and, if so, the amount of change. For example, image gradients may be determined for each image or frame and compared to determine an amount of change between the images or frames. Image gradient comparison may be beneficial as it is less susceptible to lighting changes. Other techniques, such as edge detection, pixel color comparison, depth information comparison, object detection, etc., may be utilized to process and compare the data to determine an amount of change between adjacent items of data.

In some implementations, a plurality of adjacent frames may each be compared to determine a difference between each adjacent frame and a determination made for each comparison as to the amount of change between adjacent items of data. In another example, if the input device is a load cell on the shelf of the inventory location, the obtained data may be in the form of weight measurements. In such an example, an amount of change between adjacent items of data may be a measured change in weight at the inventory location.

As the data is processed to determine an amount of change between adjacent items of data, a determination is made as to whether an activity at the inventory location has been detected, as in 1406. For example, activity may be determined if the amount of change determined between items of data exceeds an activity threshold. The activity threshold may be any value that is used to determine if a measured change is sufficient to detect an activity at the inventory location. The threshold may vary based on the inventory location, the time of day, the items at the inventory location, etc. In some implementations, it may also be determined if the difference between adjacent frames exceeds a duration threshold. For example, it may be required that the difference between adjacent frames persist for a defined period of time, or a defined number of frame comparisons (duration threshold), before it is determined that an activity has occurred.

If it is determined that the measured change between items of data does not exceed the activity threshold, the example process 1400 returns to block 1402 and continues. However, if it is determined that the measured change does exceed the activity threshold, data stored in the buffer is provided to a remote computing resource, such as the inventory management system 150, as in 1408. Likewise, the input device may begin sending obtained data to the remote computing resource while the activity is occurring and the data is obtained, as in 1410.

In addition to providing data to the remote computing resource as it is obtained, the obtained data may also be processed locally to monitor for activity termination, as in 1412. For example, in a manner similar to monitoring for activity at block 1404, adjacent items of data (e.g., frames, images) may be compared to determine changes between the items of data to monitor for a termination of the activity, as in 1412.

As the data is obtained, sent to the remote computing resource and processed locally for changes, a determination is made as to whether the determined change in the locally processed data falls below an activity termination threshold, as in 1414. The activity termination threshold may be any value that is used to determine if a measured change has decreased enough to determine that the activity at the inventory location has terminated. The activity termination threshold may vary based on the inventory location, the time of day, the items at the inventory location, etc. In some implementations, the activity threshold and the activity termination threshold may be the same. In other implementations, the activity threshold and the activity termination threshold may be different. For example, because it has been determined that activity is occurring at the inventory location, the activity termination threshold may be set to a lower value so that images of the activity are obtained and sent to the remote computing resources for processing without risking the process determining that the activity has terminated when it has actually only decreased.

If it is determined that the measured change between items of data does not exceed the activity termination threshold, indicating that the measured change between items of data has decreased, it is determined that the activity at the inventory location has terminated. If it is determined that the activity has terminated, a defined amount of data representative of the inventory location after the determined activity termination is obtained and provided to the remote computing resource, as in 1416. For example, data may be obtained and provided to the remote computing resource for a defined period of time (e.g., fifteen seconds) following the determined activity termination. After sending the defined amount of post-activity data to the remote computing resource, the input device stops sending obtained data and the process completes, as in 1418.

Returning to decision block 1414, if it is determined that the measured change still exceeds the activity termination threshold, indicating that the activity is still occurring, the example process 1400 returns to block 1410 and continues.

By buffering data locally and initially processing to monitor for activity and then sending the data to a remote computing resource for additional processing only when activity is detected, the bandwidth requirements for data transmission and the computational resources necessary at the remote computing resources are both decreased without decreasing the ability to detect activities occurring at inventory locations.

Figure 15:
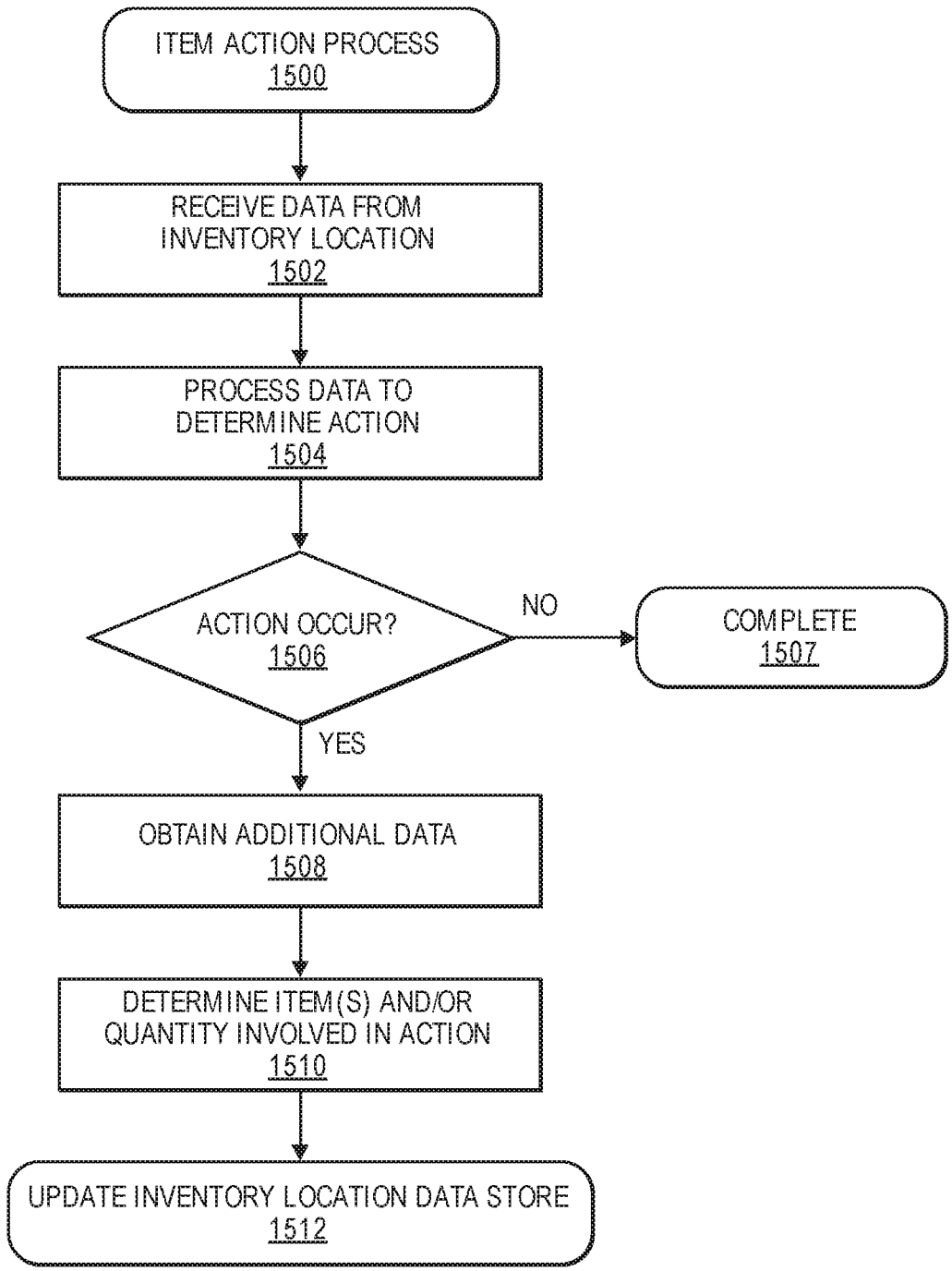
FIG. 15 is a flow diagram of an example process for determining an action, according to an implementation.

FIG. 15 is a flow diagram of an example process 1500 for determining an item action at an inventory location, according to an implementation. The example process 1500 is performed at a remote computing resource, such as the inventory management system 150. The example process 1400 begins when data is received at a remote computing resource from an input device associated with an inventory location, as in 1502. As discussed above, data may only be received from an input device when activity is detected at the inventory location.

Upon receiving data, the example process 1500 processes the data to determine if an action (item pick, item place) has occurred at the inventory location during the detected activity, as in 1504. For example, one or more items of data may be processed to determine if an item has been picked and/or placed at the inventory location. In one implementation, pixel data and/or depth information corresponding to two or more items of data may be compared to determine if an item has been picked or placed at the inventory location. The processing may begin by comparing the first item of data with the last item of data to determine the differences. Based on the determined difference, it may be determined if an item was picked and/or placed at the inventory location. For example, if the data includes depth information for pixels in the items of data, changes in depth information may be determined to identify whether an item has been picked or placed. As another example, items of data may be processed using edge detection to determine if an item has been picked or placed at the inventory location. As will be appreciated, any variety of techniques may be utilized alone or in combination to determine an action at the inventory location.

As the data is processed, a determination is made as to whether an action has occurred during the activity, as in 1506. In some examples, an activity may occur at an inventory location that does not include an action (e.g., item pick, item place). For example, a user may touch, move or otherwise reposition an item but not pick or place any items at the inventory location. In such an example, no action has occurred.

If it is determined that no action has occurred, the example process 1500 completes, as in 1507. In some implementations, the data may be processed to determine if items at the inventory location have been moved, even though there was not action (item pick, item place). For example, the data may be processed using object recognition, character recognition, etc. to determine if an item represented in the data has been moved. In such an instance, an agent or other user may be notified to reposition the item at the inventory location.

If it is determined that an action has occurred, additional data obtained during the time of the activity may be obtained from other input devices associated with the inventory location, as in 1508. For example, one or more image capture devices may be positioned on an opposing shelf and oriented to capture images/video of the inventory location. Those image capture devices may buffer data as it is obtained. The example process 1500 may request that the buffered data that was obtained during the time of the activity be provided. As another example, weight data obtained during the activity by a load cell at the inventory location may be obtained as additional data. Utilizing the received data and the obtained additional data, items involved in the action and optionally the quantity of items involved in the action are determined, as in 1510. For example, data obtained from a camera on an opposing shelf may be processed to determine an identity of the item that was picked or placed at the inventory location and/or the quantity of the items that were picked or placed at the inventory location. Processing of the data may include, for example, edge detection, object detection, character recognition, and/or other techniques to identify the item that was picked from or placed at the inventory location.

In some implementations, the items located at the inventory location may already be known to the remote computing resource and the obtained data may be processed to determine a quantity of items picked from or placed at the inventory location. In such an example, object, shape and/or edge detection may be performed on the data to determine a number of items added or removed from the inventory location.

Finally, based on the determined action, the items involved in the action and the determined quantity of items involved in the action, an inventory location data store that maintains inventory location information may be updated to correspond with the change, as in 1512.

FIG. 16 is a pictorial diagram of an illustrative implementation of a server system, such as the server system 450 that may be used in the implementations described herein. The server system 450 may include a processor 1600, such as one or more redundant processors, a video display adapter 1602, a disk drive 1604, an input/output interface 1606, a network interface 1608, and a memory 1612. The processor 1600, the video display adapter 1602, the disk drive 1604, the input/output interface 1606, the network interface 1608, and the memory 1612 may be communicatively coupled to each other by a communication bus 1610.

The video display adapter 1602 provides display signals to a local display (not shown in FIG. 16) permitting an operator of the server system 450 to monitor and configure operation of the server system 450. The input/output interface 1606 likewise communicates with external input/output devices not shown in FIG. 16, such as a mouse, keyboard, scanner, or other input and output devices that can be operated by an operator of the server system 450. The network interface 1608 includes hardware, software, or any combination thereof, to communicate with other computing devices. For example, the network interface 1608 may be configured to provide communications between the server system 450 and other computing devices via the network 402, as shown in FIG. 4.

The memory 1612 generally comprises random access memory (RAM), read-only memory (ROM), flash memory, and/or other volatile or permanent memory. The memory 1612 is shown storing an operating system 1614 for controlling the operation of the server system 450. A binary input/output system (BIOS) 1616 for controlling the low-level operation of the server system 450 is also stored in the memory 1612.

The memory 1612 additionally stores program code and data for providing network services that allow the inventory management system 150 to identify users, actions, and/or items within the materials handling facility. Accordingly, the memory 1612 may store a browser application 1618. The browser application 1618 comprises computer executable instructions that, when executed by the processor 1600, generate or otherwise obtain configurable markup documents such as Web pages. The browser application 1618 communicates with a data store manager application 1620 to facilitate data exchange between the item information data store 1615, the user profile data store 1617 and/or the inventory location data store 1619.

As used herein, the term "data store" refers to any device or combination of devices capable of storing, accessing and retrieving data which may include any combination and number of data servers, databases, data storage devices and data storage media in any standard, distributed or clustered environment. The server system 450 can include any appropriate hardware and software for integrating with the data stores 1615-1619 as needed to execute aspects of the inventory management system 150.

The data stores 1615-1619 can include several separate data tables, databases or other data storage mechanisms and media for storing data relating to a particular aspect. For example, the data stores 1615-1619 illustrated include mechanisms for maintaining inventory information (e.g., item locations, images of an item when properly positioned, depth map information for an item located on an inventory shelf, item features), user profile information, item lists associated with users, inventory tables, etc.

It should be understood that there can be many other aspects that may be stored in the data stores 1615-1619. The data stores 1615-1619 are operable, through logic associated therewith, to receive instructions from the server system 450 and obtain, update or otherwise process data in response thereto.

The memory 1612 may also include the inventory management system 150, discussed above. The inventory management system 150 may be executable by the processor 1600 to implement one or more of the functions of the server system 450. In one implementation, the inventory management system 150 may represent instructions embodied in one or more software programs stored in the memory 1612. In another implementation, the inventory management system 150 can represent hardware, software instructions, or a combination thereof.

The server system 450, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction in FIG. 16 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system, comprising:
   a first input device positioned at a first location within a materials handling facility;
   a second input device positioned at a second location within the materials handling facility, the second input device operable to transition from an inactive state to an active state;
   a computing system, including;
   one or more processors; and
   a memory coupled to the one or more processors and storing program instructions that when executed by the one or more processors cause the one or more processors to at least:
   obtain a first data from the first input device;
   process the first data to determine a movement of an object in a direction toward the second input device;
   determine that the movement is within a defined distance of the second location;
   in response to a determination that the movement of the object is in the direction toward the second input device and within the defined distance of the second location, send an instruction to the second input device instructing the second input device to transition from an inactive state to an active state and to begin obtaining data;
   subsequent to the second input device transitioning to the active state and beginning to obtain data, obtain, from the second input device, a second data representative of an inventory location within a materials handling facility;

process at least a portion of the second data to determine that an activity at the inventory location has terminated; and in response to a determination that the activity has terminated, cause the second input device to stop obtaining data.

2. The system of claim 1, wherein the program instructions that when executed by the one or more processors further cause the one or more processors to determine that the activity is occurring further include instructions that cause the one or more processors to at least:

compare a first data item of the second data with a second data item of the second data to determine a first difference between the first data item and the second data item; and determine that the first difference exceeds a first threshold.

3. The system of claim 2, wherein the program instructions that when executed by the one or more processors cause the one or more processors to determine that the activity has terminated further include instructions that cause the one or more processors to at least:

compare a third data item of a third data with a fourth data item of the third data to determine a second difference between the third data item and the fourth data item; and determine that the second difference is below a second threshold.

4. The system of claim 1, wherein the program instructions that when executed by the one or more processors further cause the one or more processors to at least:

in response to the determination that the activity has terminated, send a third data representative of the inventory location and obtained by the second input device after it is determined that the activity is terminated, to a remote computing resource; and wherein the second input device stops obtaining data after obtaining the third data.

5. The system of claim 1, wherein the program instructions that when executed by the one or more processors further cause the one or more processors to at least:

obtain with a third input device, a third data representative of the inventory location and obtained while the activity is occurring;

store the third data;

receive, from a remote computing resource, a request for the third data; and send the third data to the remote computing resource.

6. The system of claim 1, wherein the program instructions that when executed by the one or more processors further cause the one or more processors to at least:

send a third data, representative of the inventory location and obtained while the activity is occurring, to a remote computing resource as the third data is obtained.

7. The system of claim 1, wherein the second data is processed to determine if an action has occurred at the inventory location during the activity.

8. A computer-implemented method, comprising:

receiving, at a first computing resource and from a first input device positioned at a first location within a materials handling facility, a first data;

processing, at the first computing resource, the first data to determine a movement of an object in a direction toward a camera at a second position within the materials handling facility, the camera operable to transition from an inactive state to an active state;

determining that the movement is within a defined distance of the second position;

in response to determining that the movement of the object is in the direction toward the camera and within the defined distance of the second position, sending, from the first computing resource, an instruction to the camera instructing the camera to transition from an inactive state to an active state and to begin obtaining image data;

subsequent to the camera transitioning to the active state and beginning to obtain image data, receiving, at the first computing resource and from the camera, an image data;

processing, at the first computing resource, the image data to determine that an activity is occurring;

in response to determining that the activity is occurring, sending, from the first computing resource and as the image data is received, the image data to a second computing resource;

as the image data is sent to the second computing resource, processing, at the first computing resource, the image data to determine that the activity has terminated; and in response to determining that the activity has terminated, causing sending of image data to the second computing resource to terminate.

9. The computer-implemented method of claim 8, wherein processing the image data to determine that the activity is occurring, further includes:

determining a first image gradient of a first frame of the image data;

determining a second image gradient of a second frame of the image data;

comparing the first image gradient and the second image gradient to determine a difference between the first frame and the second frame; and determining that the difference exceeds a threshold.

10. The computer-implemented method of claim 8, wherein processing the image data to determine that the activity is occurring, further includes:

comparing a first plurality of adjacent frames of the image data to determine for each comparison a difference between frames; and determine that a count of differences exceeds a threshold.

11. The computer-implemented method of claim 8, further comprising:

receiving, at the first computing resource while the image data is being received and from a second camera, a second image data that includes at least a portion of a field of view corresponding to the image data; and storing the second image data.

12. The computer-implemented method of claim 8, further comprising:

processing the image data to determine if an action has occurred during the activity, wherein the action is at least one of an item pick or an item place.

13. A system, comprising:

a first device positioned at a first location within a materials handling facility;

a second device positioned at a second location within the materials handling facility, the second device operable to transition from an inactive state to an active state;

a computing system, including:

one or more processors; and a memory coupled to the one or more processors and storing program instructions that when executed by the one or more processors causes the one or more processors to at least:
  obtain data from the first device while the second device is in an inactive state;
  process the data from the first device to determine a movement of an object;
  determine, based at least in part on the movement, that the movement is in a direction toward the second device;
  determine that the movement is within a defined distance of the second device; and
  in response to a determination that the movement is in the direction toward the second device and within the defined distance, send an instruction to the second device instructing the second device to transition from the inactive state to the active state.

14. The system of claim 13, wherein the inactive state is a state in which the second device consumes less power than when in the active state.

15. The system of claim 13, wherein the first device requires less power than the second device and is maintained in an active state to monitor for movement.

16. The system of claim 13, wherein the program instructions that when executed by the one or more processors further cause the one or more processors to at least:
  determine a velocity of the movement in the direction; and
  wherein the instruction is further sent based at least in part on the velocity of the movement.

17. The system of claim 13, wherein:
  the first device is at least one of a camera, a presence detection sensor, an RFID reader, or a load cell.

18. The system of claim 13, wherein the program instructions that when executed by the one or more processors further cause the one or more processors to at least:
  determine, based at least in part on the direction of the movement, that the direction is away from a third device; and
  in response to a determination that the movement is in the direction away from the third device, send a second instruction to the third device instructing the third device to transition from the active state to the inactive state.

19. The system of claim 13, wherein the program instructions that when executed by the one or more processors further cause the one or more processors to at least:
  in response to the determination that the movement of the object is in the direction:
    determine a plurality of devices that are in the direction of the movement, wherein the plurality of devices include the second device; and
    send at least one instruction to each of the plurality of devices to transition from the inactive state to the active state.

20. The system of claim 13, wherein the program instructions that when executed by the one or more processors further cause the one or more processors to at least:
  determine a velocity of the movement;
  determine, from a transition table maintained in a data store, an average time required to transition the second device from the inactive state to the active state;
  determine, based on the velocity of the movement and the average time, a distance by which the instruction must be sent to the second device instructing the second device to transition from the inactive state to the active state such that the second device will be in the active state when the object reaches the second device; and
  wherein the instruction is sent prior to the object being at the distance.

* * * * *